(12) United States Patent
Khoshnevisan et al.

(10) Patent No.: US 11,705,993 B2
(45) Date of Patent: Jul. 18, 2023

(54) SEMI-STATIC HARQ-ACK CODEBOOK ENHANCEMENTS FOR NR-U

(71) Applicant: QUALCOMM Incorporated, San Diego, CA (US)

(72) Inventors: Mostafa Khoshnevisan, San Diego, CA (US); Jing Sun, San Diego, CA (US); Kapil Bhattad, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 16/825,364

(22) Filed: Mar. 20, 2020

(65) Prior Publication Data
US 2020/0313803 A1 Oct. 1, 2020

(30) Foreign Application Priority Data
Mar. 29, 2019 (IN) .............................. 201941012482

(51) Int. Cl.
*H04L 1/1812* (2023.01)
*H04W 72/21* (2023.01)
*H04W 72/23* (2023.01)

(52) U.S. Cl.
CPC .......... *H04L 1/1812* (2013.01); *H04W 72/21* (2023.01); *H04W 72/23* (2023.01)

(58) Field of Classification Search
CPC combination set(s) only.
See application file for complete search history.

(56) References Cited

U.S. PATENT DOCUMENTS 10,686,562 B2 * 6/2020 Xiao ..................... H04L 1/1607
2018/0376490 A1 * 12/2018 Lunttila ................ H04L 5/0055
(Continued)

FOREIGN PATENT DOCUMENTS

| EP | 3471309 A1 | 4/2019 |
|---|---|---|
| KR | 20180136907 A | 12/2018 |

OTHER PUBLICATIONS

International Search Report and Written Opinion—PCT/US2020/024274—ISA/EPO—dated Sep. 23, 2020.
(Continued)

*Primary Examiner* — Hanh N Nguyen
(74) *Attorney, Agent, or Firm* — Norton Rose Fulbright LLP

(57) ABSTRACT

Hybrid automatic repeat request (HARQ)-acknowledgement (ACK) feedback codebook enhancements are disclosed. A size of feedback codebook may be reduced explicitly or implicitly. For example, an indicator may be identified by a corresponding field of a downlink control message. In some aspects, the indicator may indicate that multiple Physical Downlink or Uplink Shared Channels (PDSCHs/PUSCHs) are actually scheduled during one or more slots of a window corresponding to the feedback codebook. Responsive to receiving the indicator, a device may refrain from reducing the size of the feedback codebook to exclude acknowledgement feedback for additional possible PDSCH/PUSCH occasions of the slots of the window. In some aspects, a device identifies possible PDSCH/PUSCH occasions that occur outside of one or more Channel Occupancy Times (COTs) of a window. The device may generate a reduced size feedback codebook by excluding the possible PDSCH/PUSCH occasions that occur outside of the COTs of the window.

21 Claims, 13 Drawing Sheets

(56) References Cited

U.S. PATENT DOCUMENTS

| | | | |
|---|---|---|---|
| 2019/0261382 A1* | 8/2019 | Tian | H04W 74/0808 |
| 2020/0053766 A1* | 2/2020 | Chien | H04L 1/1854 |
| 2020/0177323 A1* | 6/2020 | Fakoorian | H04L 5/0007 |
| 2021/0184801 A1* | 6/2021 | El Hamss | H04L 5/0091 |
| 2021/0328728 A1* | 10/2021 | El Hamss | H04L 5/0091 |
| 2021/0360698 A1* | 11/2021 | Xu | H04W 72/042 |
| 2022/0021486 A1* | 1/2022 | Yang | H04L 1/1664 |
| 2022/0322314 A1* | 10/2022 | Rastegardoost | H04L 1/1854 |

OTHER PUBLICATIONS

NTT Docomo, et al., "UCI Enhancements for URLLCU", 3GPP Draft, 3GPP TSG RAN WG1 #96, R1-1902805_UCI Enhancement, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600500, 10 pages, Retrieved from the Internet: URL: http://www.3gpp.org/ftp/tsg%5Fran/WG1%5FRL1/TSGR1%5F96/Docs/R1%2D1902805%2EZip, [retrieved on Feb. 16, 2019], figures 1-12, Section 2.

Partial International Search Report—PCT/US2020/024274—ISAEPO—dated Jul. 9, 2020.

\* cited by examiner

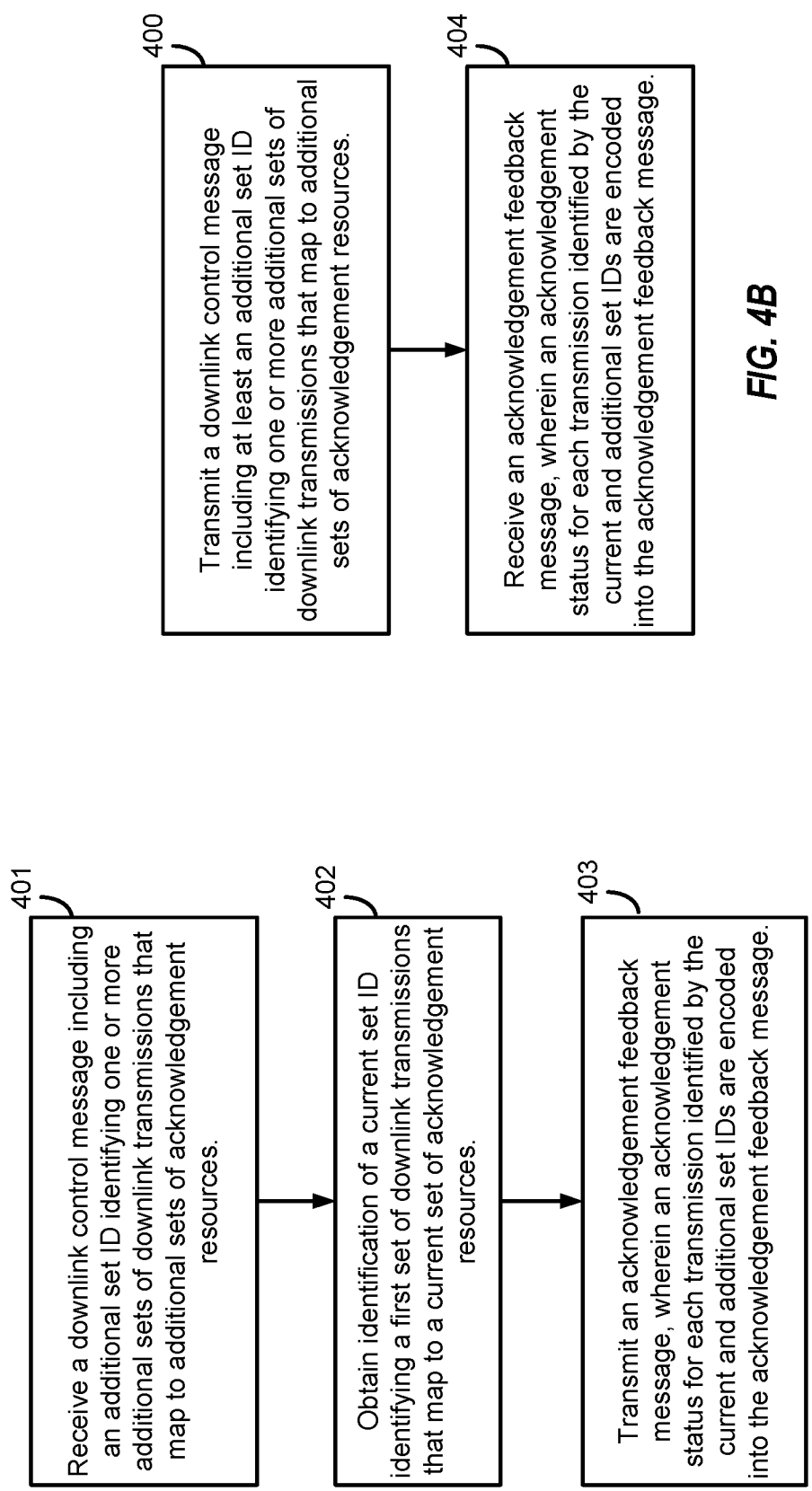

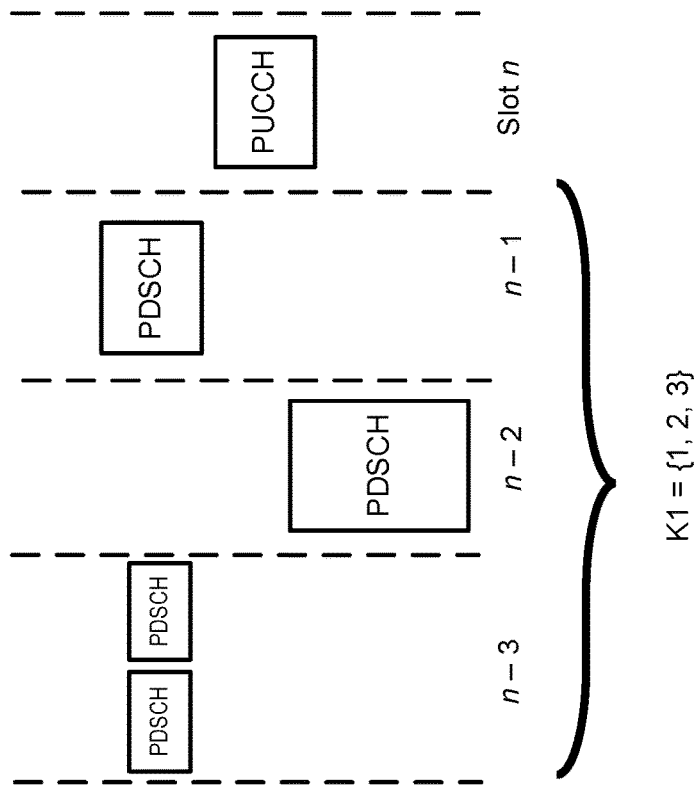
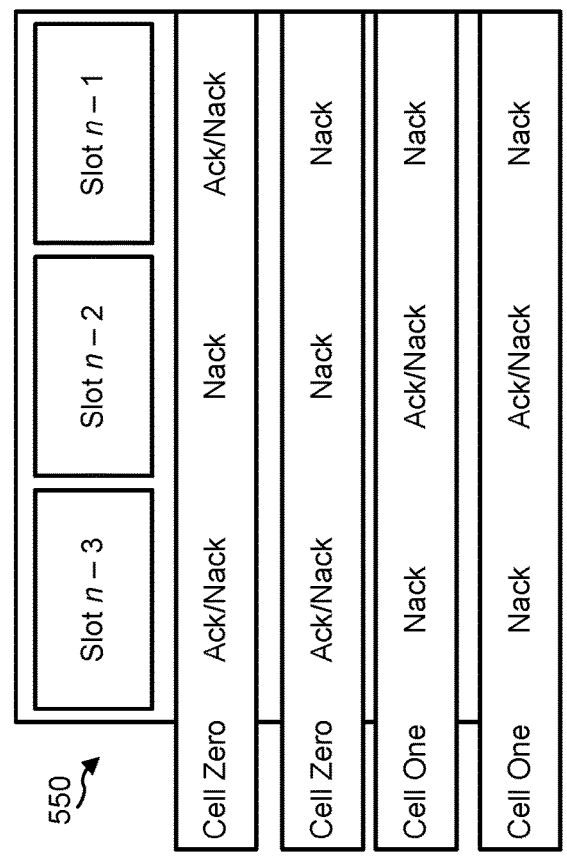
FIG. 5A
FIG. 5B

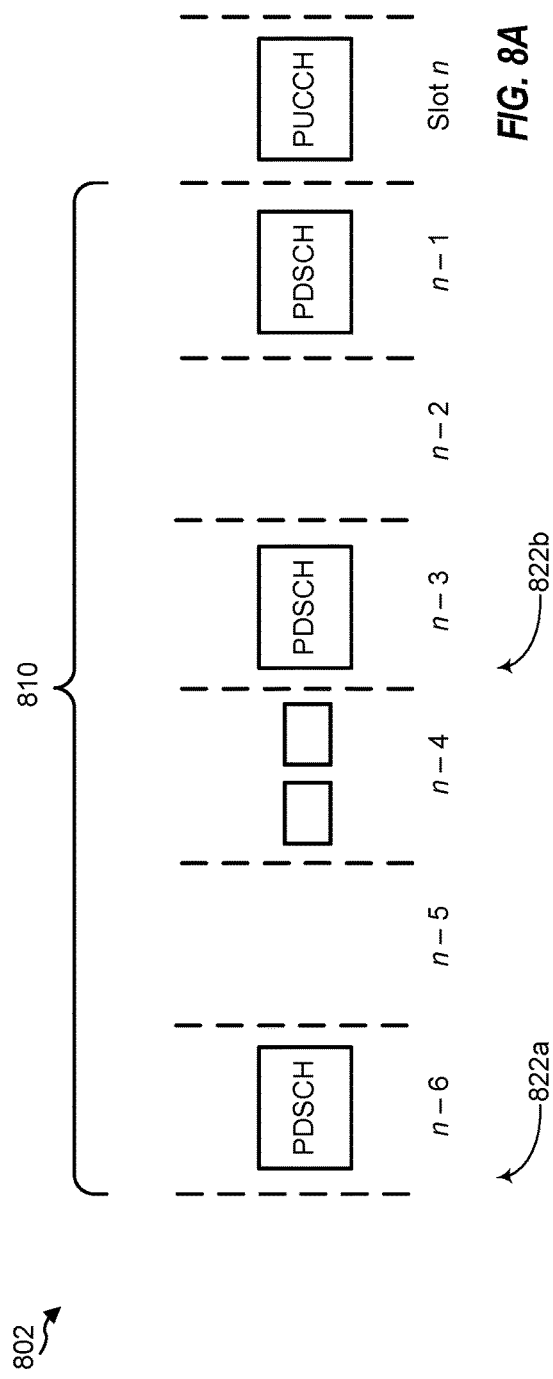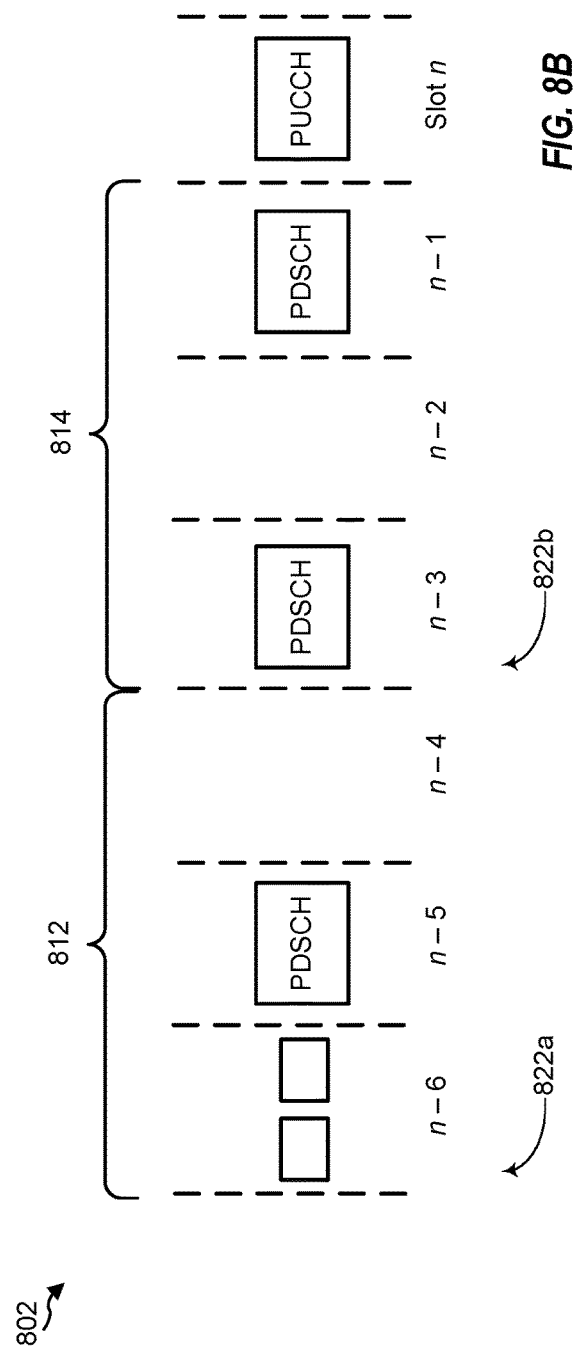

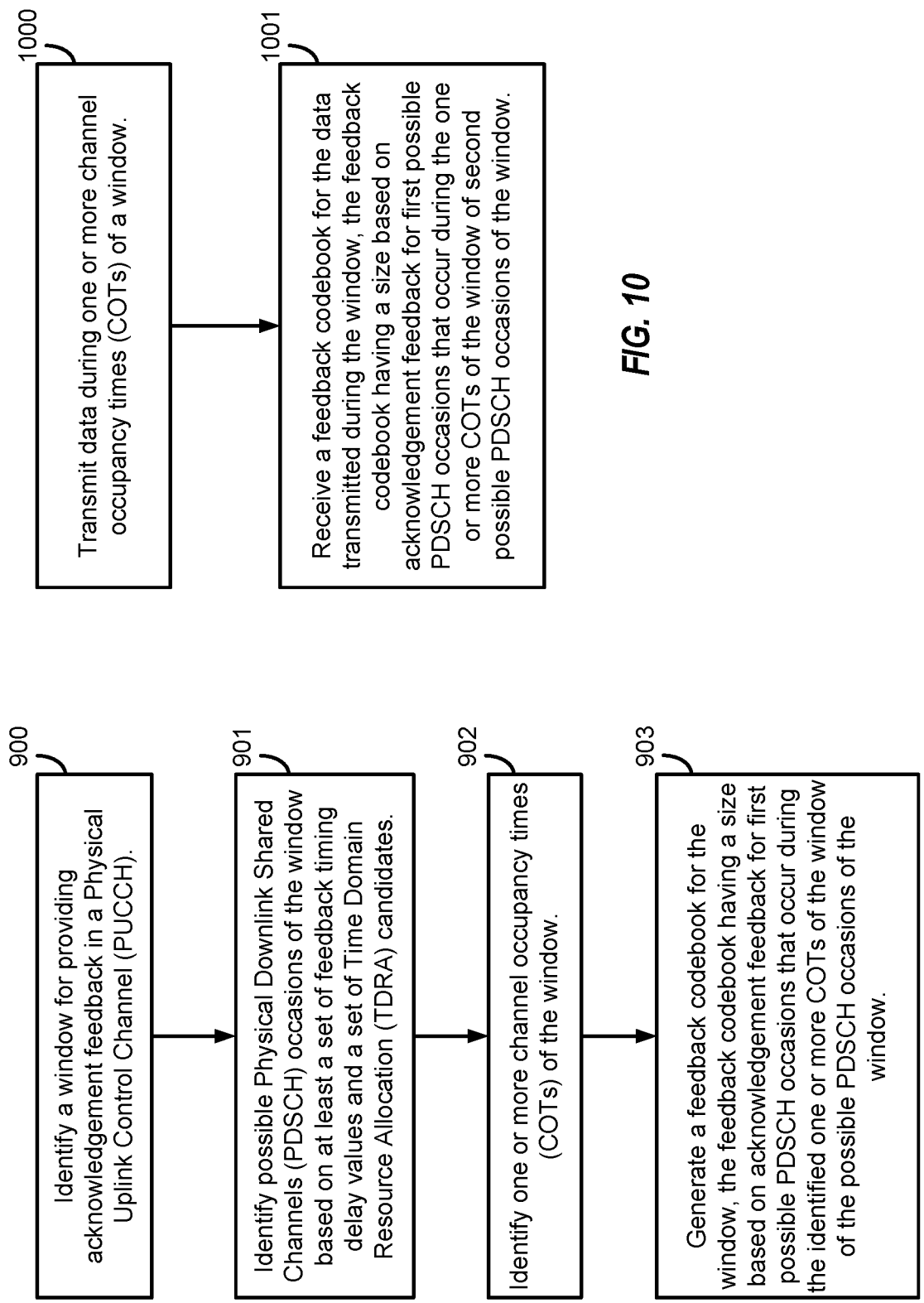

SEMI-STATIC HARQ-ACK CODEBOOK ENHANCEMENTS FOR NR-U

CROSS-REFERENCE TO RELATED APPLICATIONS

This application claims the benefit of a Indian Patent Application No. 201941012482, entitled, "SEMI-STATIC HARQ-ACK CODEBOOK ENHANCEMENTS FOR NR-U," filed on Mar. 29, 2019, which is expressly incorporated by reference herein in its entirety.

TECHNICAL FIELD

Aspects of the present disclosure relate generally to wireless communication systems, and more particularly, to improvements for hybrid automatic repeat request (HARQ)-acknowledgement (ACK) feedback codebooks for UE ACK transmission.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes identifying, by a user equipment (UE), a window for providing acknowledgement feedback in a Physical Uplink Control Channel (PUCCH), identifying, by the UE, possible Physical Downlink Shared Channel (PDSCH) occasions of the window based on at least a set of feedback timing delay values and a set of Time Domain Resource Allocation (TDRA) candidates, identifying, by the UE, one or more channel occupancy times (COTs) of the window, and generating, by the UE, a feedback codebook for the window, the feedback codebook having a size based on acknowledgement feedback for first possible PDSCH occasions that occur during the identified one or more COTs of the window of the possible PDSCH occasions of the window.

In an additional aspect of the disclosure, a method of wireless communication includes receiving, by a user equipment (UE) during a slot of a window, a downlink control message including an indicator that indicates that multiple Physical Downlink Shared Channels (PDSCHs) are actually scheduled for at least one slot of the window, and refraining, by the UE, from reducing a size of a feedback codebook based on the indicator.

In an additional aspect of the disclosure, a method of wireless communication includes transmitting, by a base station, data during one or more channel occupancy times (COTs) of a window, and receiving, by the base station, a feedback codebook for the window, the feedback codebook having a size based on acknowledgement feedback for first possible PDSCH occasions that occur during the one or more COTs of the window of second possible PDSCH occasions of the window.

In an additional aspect of the disclosure, a method of wireless communication includes transmitting, by a base station during a window, a downlink control message including an indicator field that is configured to indicate whether multiple Physical Downlink Shared Channels (PDSCHs) are actually scheduled for at least one slot of the window, and receiving, by the base station, a feedback codebook generated based on the indicator field, wherein the feedback codebook has a reduced size when the indicator field indicates that multiple PDSCHs are not actually scheduled for at least one slot of the window.

In an additional aspect of the disclosure, a method of wireless communication includes transmitting, by a base station during a slot of a window, a downlink control message including a bitmap indicator that indicates that multiple Physical Downlink Shared Channels (PDSCHs) are actually scheduled for one or more first slots of the window and that indicates that a single PDSCH is actually scheduled for one or more second slots of the window, and receiving, by the base station, a feedback codebook associated with the bitmap indicator, wherein the feedback codebook does not include acknowledgement feedback entries for multiple PDSCHs for the one or more second slots of the window.

In an additional aspect of the disclosure, an apparatus configured for wireless communication is disclosed. The apparatus includes means for identifying, by a user equipment (UE), a window for providing acknowledgement feedback in a Physical Uplink Control Channel (PUCCH), means for identifying possible Physical Downlink Shared Channel (PDSCH) occasions of the window based on at least a set of feedback timing delay values and a set of Time Domain Resource Allocation (TDRA) candidates, means for identifying one or more channel occupancy times (COTs) of the window, and means for generating a feedback codebook for the window, the feedback codebook having a size based on acknowledgement feedback for first possible PDSCH occasions that occur during the identified one or more COTs of the window of the possible PDSCH occasions of the window.

In an additional aspect of the disclosure, an apparatus configured for wireless communication is disclosed. The apparatus includes means for receiving, by a user equipment (UE) during a slot of a window, a downlink control message including an indicator that indicates that multiple Physical Downlink Shared Channels (PDSCHs) are actually scheduled for at least one slot of the window, and means for refraining, by the UE, from reducing a size of a feedback codebook based on the indicator.

In an additional aspect of the disclosure, an apparatus configured for wireless communication is disclosed. The apparatus includes means for transmitting, by a base station, data during one or more channel occupancy times (COTs) of a window, and means for receiving, by the base station, a feedback codebook for the window, the feedback codebook having a size based on acknowledgement feedback for first possible PDSCH occasions that occur during the one or more COTs of the window of second possible PDSCH occasions of the window.

In an additional aspect of the disclosure, an apparatus configured for wireless communication is disclosed. The apparatus includes means for transmitting, by a base station during a window, a downlink control message including an indicator field that is configured to indicate whether multiple Physical Downlink Shared Channels (PDSCHs) are actually scheduled for at least one slot of the window, and means for receiving, by the base station, a feedback codebook generated based on the indicator field, wherein the feedback codebook has a reduced size when the indicator field indicates that multiple PDSCHs are not actually scheduled for at least one slot of the window.

In an additional aspect of the disclosure, an apparatus configured for wireless communication is disclosed. The apparatus includes means for transmitting, by a base station during a slot of a window, a downlink control message including a bitmap indicator that indicates that multiple Physical Downlink Shared Channels (PDSCHs) are actually scheduled for one or more first slots of the window and that indicates that a single PDSCH is actually scheduled for one or more second slots of the window, and means for receiving, by the base station, a feedback codebook associated with the bitmap indicator, wherein the feedback codebook does not include acknowledgement feedback entries for multiple PDSCHs for the one or more second slots of the window.

In an additional aspect of the disclosure, a non-transitory computer-readable medium having program code recorded thereon. The program code further includes code to program code executable by a computer for causing the computer to identify, by a user equipment (UE), a window for providing acknowledgement feedback in a Physical Uplink Control Channel (PUCCH), program code executable by a computer for causing the computer to identify, by the UE, possible Physical Downlink Shared Channel (PDSCH) occasions of the window based on at least a set of feedback timing delay values and a set of Time Domain Resource Allocation (TDRA) candidates, program code executable by a computer for causing the computer to identify, by the UE, one or more channel occupancy times (COTs) of the window, and program code executable by a computer for causing the computer to generate, by the UE, a feedback codebook for the window, the feedback codebook having a size based on acknowledgement feedback for first possible PDSCH occasions that occur during the identified one or more COTs of the window of the possible PDSCH occasions of the window.

In an additional aspect of the disclosure, a non-transitory computer-readable medium having program code recorded thereon. The program code further includes code to program code executable by a computer for causing the computer to receive, by a user equipment (UE) during a slot of a window, a downlink control message including an indicator that indicates that multiple Physical Downlink Shared Channels (PDSCHs) are actually scheduled for at least one slot of the window, and program code executable by a computer for causing the computer to refrain, by the UE, from reducing a size of a feedback codebook based on the indicator.

In an additional aspect of the disclosure, a non-transitory computer-readable medium having program code recorded thereon. The program code further includes code to program code executable by a computer for causing the computer to transmit, by a base station, data during one or more channel occupancy times (COTs) of a window, and program code executable by a computer for causing the computer to receive, by the base station, a feedback codebook for the window, the feedback codebook having a size based on acknowledgement feedback for first possible PDSCH occasions that occur during the one or more COTs of the window of second possible PDSCH occasions of the window.

In an additional aspect of the disclosure, a non-transitory computer-readable medium having program code recorded thereon. The program code further includes code to program code executable by a computer for causing the computer to transmit, by a base station during a window, a downlink control message including an indicator field that is configured to indicate whether multiple Physical Downlink Shared Channels (PDSCHs) are actually scheduled for at least one slot of the window, and program code executable by a computer for causing the computer to receive, by the base station, a feedback codebook generated based on the indicator field, wherein the feedback codebook has a reduced size when the indicator field indicates that multiple PDSCHs are not actually scheduled for at least one slot of the window.

In an additional aspect of the disclosure, a non-transitory computer-readable medium having program code recorded thereon. The program code further includes code to program code executable by a computer for causing the computer to transmit, by a base station during a slot of a window, a downlink control message including a bitmap indicator that indicates that multiple Physical Downlink Shared Channels (PDSCHs) are actually scheduled for one or more first slots of the window and that indicates that a single PDSCH is actually scheduled for one or more second slots of the window, and program code executable by a computer for causing the computer to receive, by the base station, a feedback codebook associated with the bitmap indicator, wherein the feedback codebook does not include acknowledgement feedback entries for multiple PDSCHs for the one or more second slots of the window.

In an additional aspect of the disclosure, an apparatus configured for wireless communication is disclosed. The apparatus includes at least one processor, and a memory coupled to the processor. The processor is configured to identify, by a user equipment (UE), a window for providing acknowledgement feedback in a Physical Uplink Control Channel (PUCCH), identify, by the UE, possible Physical Downlink Shared Channel (PDSCH) occasions of the window based on at least a set of feedback timing delay values and a set of Time Domain Resource Allocation (TDRA) candidates, identify, by the UE, one or more channel occupancy times (COTs) of the window; and generate, by the UE, a feedback codebook for the window, the feedback codebook having a size based on acknowledgement feedback for first possible PDSCH occasions that occur during the identified one or more COTs of the window of the possible PDSCH occasions of the window.

In an additional aspect of the disclosure, an apparatus configured for wireless communication is disclosed. The apparatus includes at least one processor, and a memory coupled to the processor. The processor is configured to receive, by a user equipment (UE) during a slot of a window, a downlink control message including an indicator that indicates that multiple Physical Downlink Shared Channels (PDSCHs) are actually scheduled for at least one slot of the window, and refrain, by the UE, from reducing a size of a feedback codebook based on the indicator.

In an additional aspect of the disclosure, an apparatus configured for wireless communication is disclosed. The apparatus includes at least one processor, and a memory coupled to the processor. The processor is configured to transmit, by a base station, data during one or more channel occupancy times (COTs) of a window, and receive, by the base station, a feedback codebook for the window, the feedback codebook having a size based on acknowledgement feedback for first possible PDSCH occasions that occur during the one or more COTs of the window of second possible PDSCH occasions of the window.

In an additional aspect of the disclosure, an apparatus configured for wireless communication is disclosed. The apparatus includes at least one processor, and a memory coupled to the processor. The processor is configured to transmit, by a base station during a window, a downlink control message including an indicator field that is configured to indicate whether multiple Physical Downlink Shared Channels (PDSCHs) are actually scheduled for at least one slot of the window, and receive, by the base station, a feedback codebook generated based on the indicator field, wherein the feedback codebook has a reduced size when the indicator field indicates that multiple PDSCHs are not actually scheduled for at least one slot of the window.

In an additional aspect of the disclosure, an apparatus configured for wireless communication is disclosed. The apparatus includes at least one processor, and a memory coupled to the processor. The processor is configured to transmit, by a base station during a slot of a window, a downlink control message including a bitmap indicator that indicates that multiple Physical Downlink Shared Channels (PDSCHs) are actually scheduled for one or more first slots of the window and that indicates that a single PDSCH is actually scheduled for one or more second slots of the window, and receive, by the base station, a feedback codebook associated with the bitmap indicator, wherein the feedback codebook does not include acknowledgement feedback entries for multiple PDSCHs for the one or more second slots of the window.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A and 4B are block diagrams illustrating example blocks executed to implement one aspect of the present disclosure.

FIG. 5A is a diagram illustrating an example of transmissions of a window.

FIG. 5B is a block diagram illustrating an example of a feedback codebook corresponding to the transmissions of the window of FIG. 5A.

FIG. 8A is a first example of a block diagram illustrating a portion of an NR network in which communications occur between a base station and UE each configured according to aspects of the present disclosure.

FIG. 8B is a second example of a block diagram illustrating a portion of an NR network in which communications occur between a base station and UE each configured according to aspects of the present disclosure.

FIG. 9 is a block diagram illustrating example blocks executed by a UE configured according to an aspect of the present disclosure.

FIG. 10 is a block diagram illustrating example blocks executed by a base station configured according to an aspect of the present disclosure.

DETAILED DESCRIPTION

Figure 1:
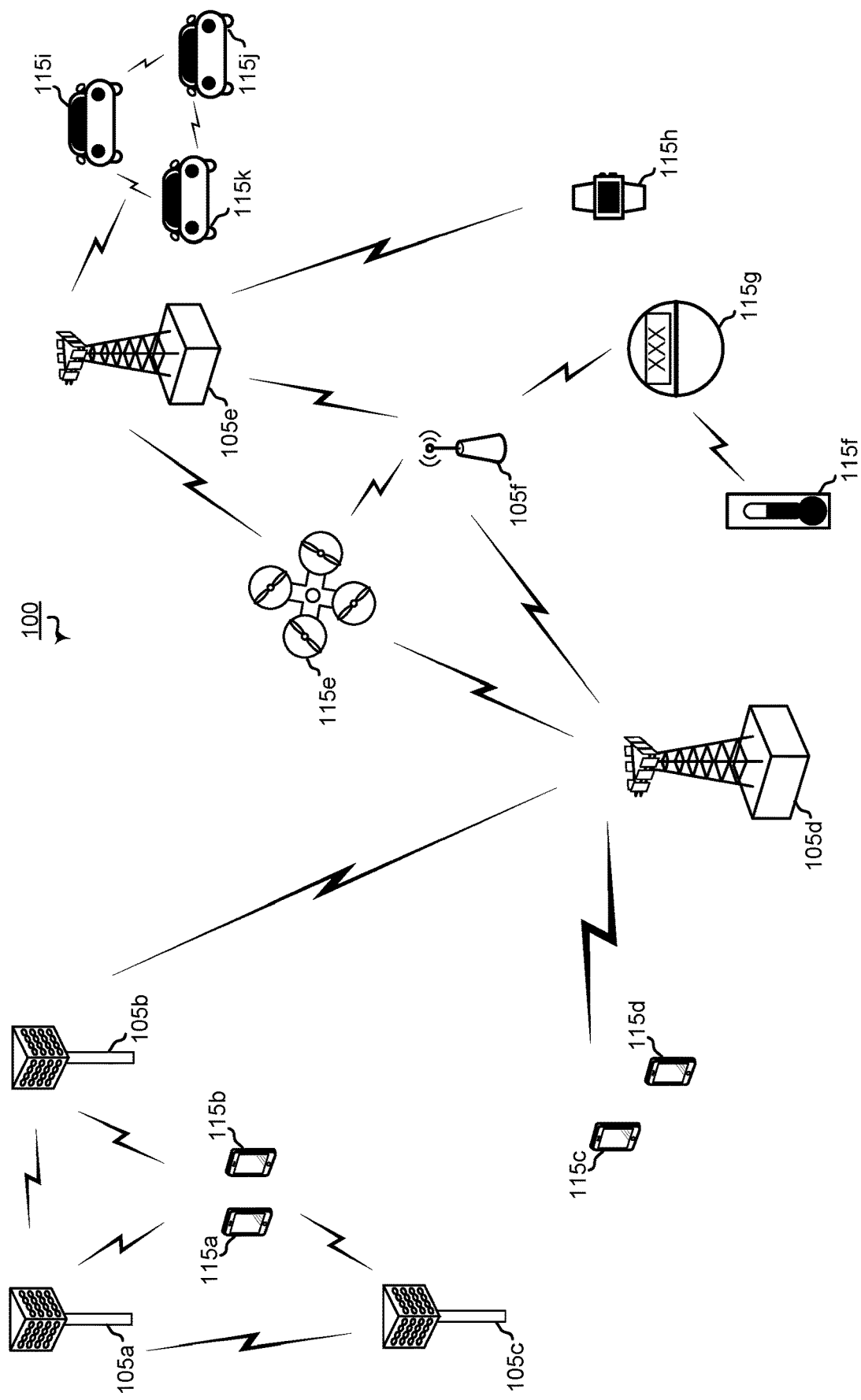
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM.

3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
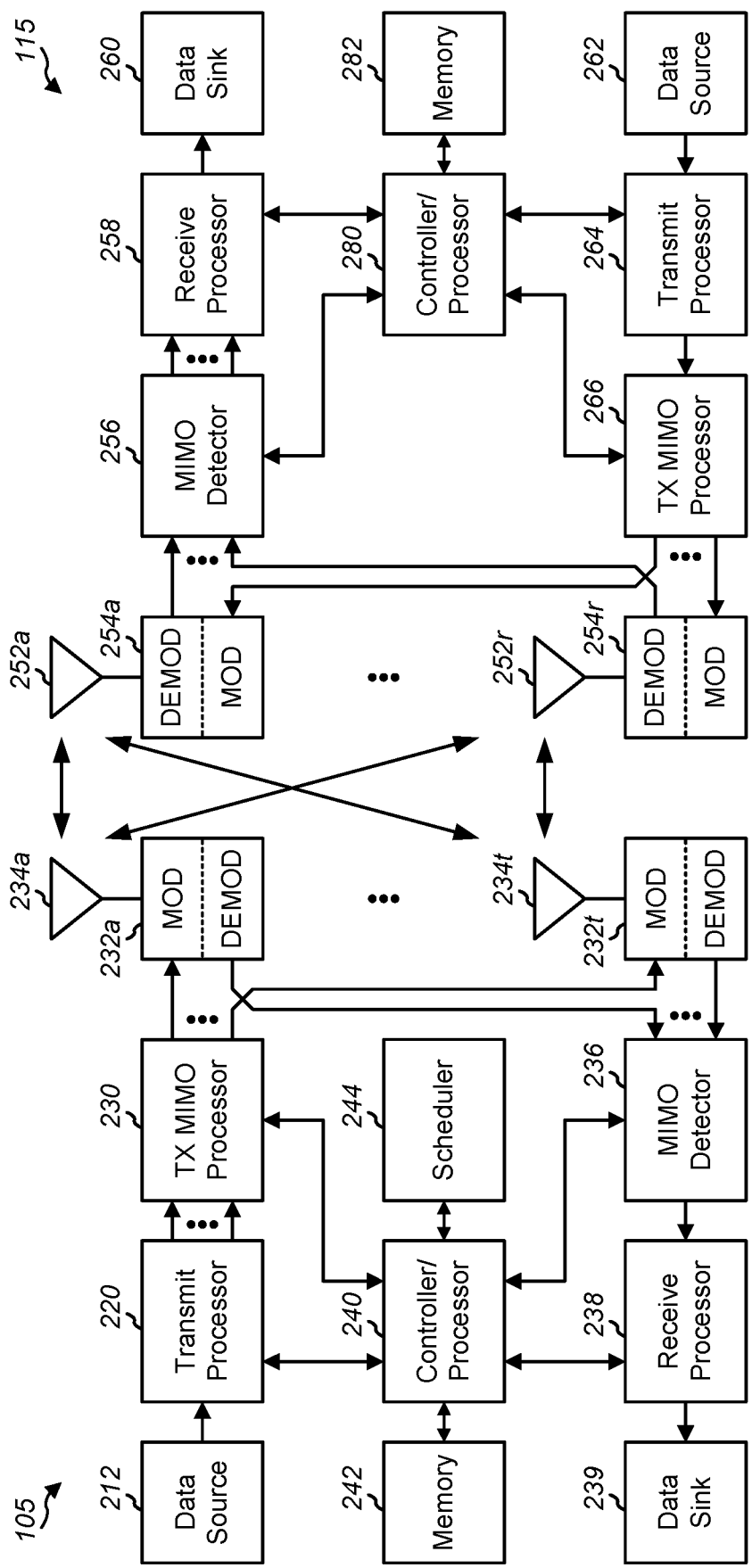
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 4A, 4B, 9, 10, 11, 12, and 13, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
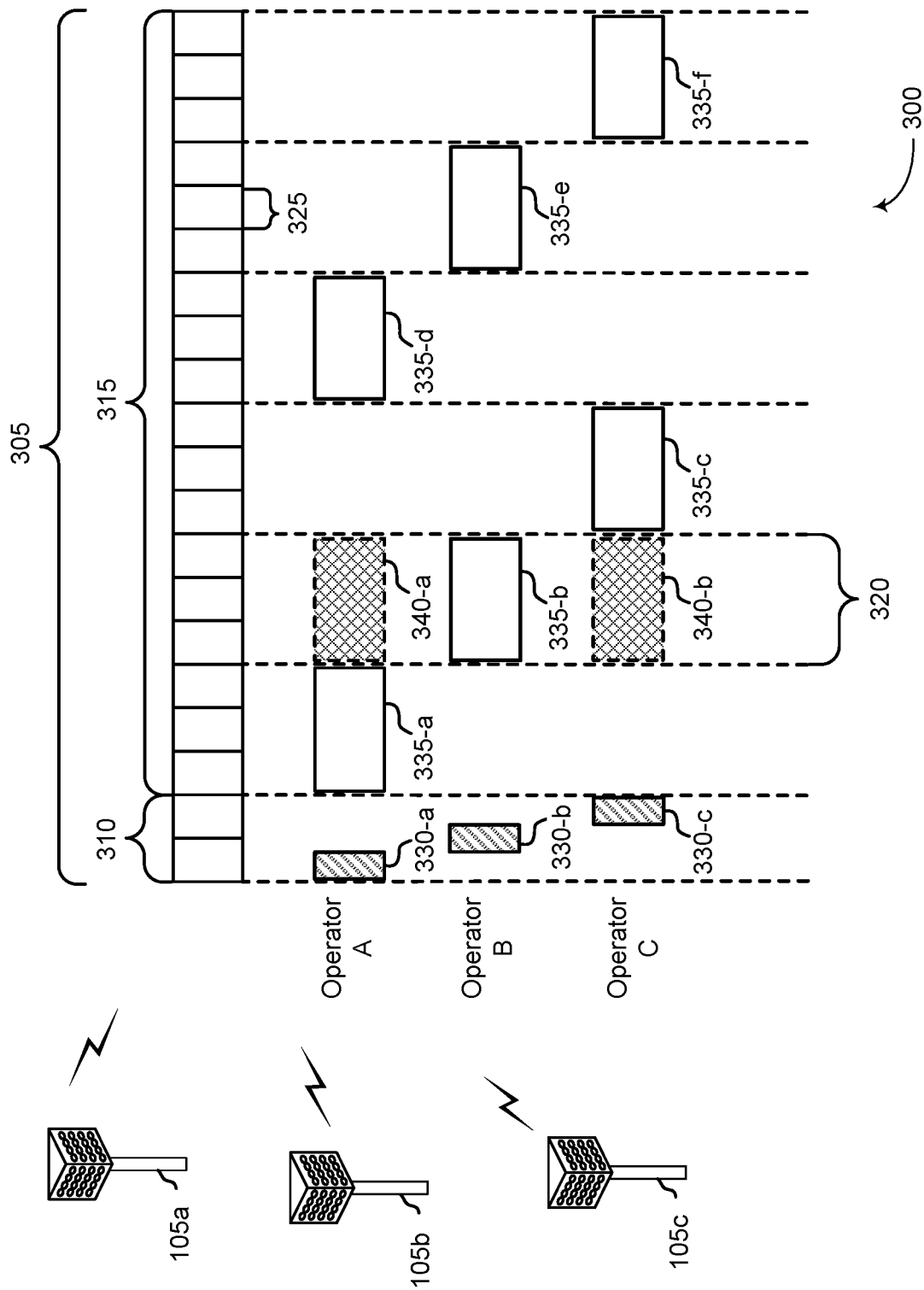
FIG. 3 is a illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320

(e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

NR access technologies provide for a downlink control message, such as a downlink control information (DCI) that includes a signal-to-acknowledgement (ACK) delay indicator field which determines where an acknowledgement (e.g., ACK/NACK) may be sent for a received transmission (e.g., PDCCH, PDSCH, etc.). Transmissions that map to the same acknowledgement resource may be sent together. NR technologies currently support two modes for codebook size determination for HARQ feedback: semi-static and dynamic modes.

In the semi-static mode, the UE may assume that all transmission time intervals (TTIs) that could have acknowledgement information on that particular acknowledgement resource may be present for computation of the acknowledgement codebook size. This procedure may result in high overhead but is robust enough to account for missed transmissions. For downlink control transmissions that were not detected, the UE would send a negative acknowledgement (NACK).

It should be noted that downlink transmissions (e.g., PDCCH, PDSCH) that map to a second acknowledgement resource but that are within the semi-static acknowledgement codebook size determination window of a first acknowledgement resource will not be sent on the first acknowledgement resources.

In the dynamic mode, the UE may assume that only the detected control transmissions will be available for codebook size computation. Downlink control messaging in the dynamic mode includes downlink assignment indices (DAIs) identifying a total number of downlink transmissions (tDAI) for acknowledgement and a counter identifying which number of that total the current transmission slot is (cDAI). The use of both tDAI and cDAI creates a robust correction mechanism for identifying or reducing the occasions of false PDCCH detects or missed PDCCH detects. Acknowledgement feedback signals may not be received by the serving base station, whether they were never sent by the UE because of listen before talk (LBT) failure or, if sent, never successfully received and decoded by the base station. Previously described solutions have suggested providing a mechanism to retransmit failed acknowledgement feedback or transmit it along with the acknowledgement feedback of future downlink transmissions.

FIGS. 4A and 4B are block diagrams illustrating example blocks executed by a base station (FIG. 4A) and a UE (FIG. 4B) to implement aspects of the previously suggested techniques. The previously suggested techniques for HARQ enhancement techniques have proposed that all HARQ acknowledgement transmissions that are sent in a particular acknowledgement resource can be grouped into the same group. A group ID may be explicitly indicated in the DCI or may be implicitly derived from the acknowledgement resource (e.g., based on the slot number of the acknowledgement resource or based on acknowledgement resource indicator (ARI) sent in the DCI, etc.). Transmission of new group indicator (NGI) bits has been further considered which toggle at every new instance of the group to indicate alternate instances of the same group ID. Separate identification of such different instances of the same group ID can avoid confusion between the base station and UE if the UE fails to successfully receive all PDCCHs for a particular instance.

At block 400, a base station transmits a downlink control message to a UE, wherein the downlink control message includes an additional set ID identifying one or more additional sets of downlink transmissions that map to one or more additional sets of acknowledgement resources. For example, a base station, based on a stored acknowledgement status of various sets of transmissions, determines a set of prior transmissions that have either not been acknowledged or that have been negatively acknowledged (NACK) and sets an additional group or set ID in the downlink control message. The base station would transmit this downlink control message to a served UE.

At block 401, a UE receives the downlink control message from the serving base station, wherein the downlink control message includes at least the additional group ID identifying one or more additional sets of downlink transmissions that map to the additional sets of acknowledgement resources. The UE would receive the downlink control message and decode the additional group ID from the message, which may then be stored in memory at the UE. The additional group ID may identify a single set of transmissions or multiple sets of transmissions. When there are a number of possible sets of transmissions that may be identified as an additional group, the additional group ID may include a bitmap, in which the of length of the bitmap equals the number of sets minus one (e.g., length_of_bitmap=(number_of_sets−1)). Activated sets of transmissions may be indicated in the bitmap for the UE to determine which corresponding acknowledgement status information to include in the acknowledgement feedback.

At block 402, the UE obtains identification of a current group ID identifying a first set of downlink transmissions that map to a current set of acknowledgement resources. The UE may obtain the current group ID either directly from the base station, by including the current group ID in the downlink control message with the additional group ID. Whether received directly from the base station or derived based on available information, the UE would store the current group ID in memory. The current group ID indicates the group ID for the current set of downlink transmissions (e.g., PDCCH, PDSCH) that map to the same acknowledgement resource, while the additional group ID indicates a previous group ID whose corresponding acknowledgement information is to be include along with the acknowledgement information for the current group ID.

The UE may implicitly obtain the current group ID by deriving the group ID based on parameters, such as slot index of the acknowledgement transmission time and ARI. Moreover, the base station may configure the number group IDs via radio resource control (RRC) signaling, while the group ID can be the parameters above the modulo of the number of group IDs. In certain aspects, the slot index or time may be used to introduce variation of group ID, and the ARI can be used to allow a level of base station control in case there is group index collision, such as where the group IDs begins to repeat. For example, if the group ID is determined by the equation:

$$\text{group ID}=\text{slot ID mod number of group IDs} \qquad (1)$$

Where the acknowledgement feedback message is scheduled to be sent on slot number X and there are X+ number of sets, then they will have the same group ID, which may not be what the base station intended if it did not successfully receive the first acknowledgement message. Use of the ARI allows flexibility for the base station by setting the function for determining group ID to the equation:

$$\text{group ID}=(\text{slot ID}+\text{ARI})\text{mod number of group IDs} \qquad (2)$$

The base station may then change the ARI to also have control over determination of the group ID. The group ID may also be derived partly implicitly and partly through explicit indication in a downlink control DCI.

At block 403, the UE transmits an acknowledgement feedback message to the serving base station, wherein an acknowledgement status for each transmission identified by the current group ID and the additional group ID is encoded into the acknowledgement feedback message. If the current group ID is the same as the additional group ID, then no previous acknowledgement information would be included in the feedback message. Only where the current and additional group IDs are different would the UE be triggered to retransmit or send the additional acknowledgement information associated with the previous sets of transmissions identified. In additional aspects, where the additional group ID is indicated via a bitmap, as noted above, the UE can directly concatenate the acknowledgement status bits sequentially according to the bitmap/indication of additional group ID(s), which may either follow or precede the current acknowledgement feedback.

At block 404, the base station receives the acknowledgement feedback message from the UE, wherein an acknowledgement status for each transmission identified by the current and additional group IDs are encoded into the acknowledgement feedback message.

The acknowledgement resource (e.g., time resources) used for acknowledgement transmissions and retransmissions are often specified by a delay value included in a downlink control message (e.g., DCI). The location of the acknowledgement resource would be given by the beginning of the downlink transmission slot plus this delay value (e.g., PDSCH slot-to-HARQ-ACK-delay value).

When operating in a NR mode, a downlink control message (e.g., DCI) includes information identifying one or more acknowledgement resources. For example, the downlink control message includes information identifying a feedback delay indicator, also known as feedback delay timing. To illustrate, DCI Formats 1-0 and 1-1 (e.g., DCI formats for scheduling one or more PDSCHs) have a PDSCH-to-HARQ feedback timing indicator field (K1 field) that is used to identify or indicate a location of HARQ feedback in terms of a number of slots after reception of the one or more PDSCHs (i.e. HARQ delay). In some implementations, the feedback timing indicator field (K1) can be 3 bits long, i.e., indicate 8 possible delay values, such as 0-7 which corresponds to 1-8 slots after reception. When the downlink control message (e.g., DCI) has the DCI Format 1-0, the feedback delay indicator may correspond to the feedback delay value. For example, a field value of 0-7 indicates a feedback delay value of 1-8 slots. When the downlink control message (e.g., DCI) has the DCI Format 1-1, the feedback delay indicator may indicate a member of a set of values. For example, the feedback delay value may come from a RRC configured set called "dl-DataToUL-ACK" and the feedback value of the feedback timing indicator field (K1) indicates a particular member of the set, i.e., a value of 0 indicates a first member, a value of 1 indicates a second member, etc. In some implementation, such as "Release 15" (3GPP Specification Number TR 25-915), a maximum size of the set is 8 and a maximum feedback value of the set is 15.

When operating in a NR-U mode, operational scheduling rules may dictate that Listen Before Talk (LBT) gaps be inserted between switches from DL to UL, UL to DL, or both. In such implementations, a serving cell, e.g., a gNB, creates LBT gaps for switches from DL to UL. The LBT gaps increase overhead and results in potential loss of access to the medium. To avoid increased overhead, the serving cell may choose a frame structure (i.e., layout of DL and UL subframes or slots) that has limited switches between UL and DL. For example, a servicing cell may choose a frame structure that has a single switch from DL to UL, such as a single switch in a COT. However, this particular frame structure leads to a long burst of DL slots followed by one or more UL slots in which there is less opportunities to report HARQ-ACK feedback in or for the frame. Accordingly, a size of a feedback codebook used to store HARQ-ACK feedback for the frame, or a window thereof, is increased. As an illustrative example, for a subcarrier spacing (SCS) of 60 kHz and a COT with a 6 ms length where a first 5 ms of the COT corresponds to or is configured as DL slots, there will be 20 contiguous DL slots before an opportunity to provide acknowledgement feedback occurs, i.e., an UL slot in which the acknowledgement feedback for one or more of the 20 DL may be sent.

When operating in a semi-static mode, feedback codebook size may be determined by semi-static information and based on PDSCH occasions, such as all possible or potential occasions where a PDSCH could occur. In the semi-static mode, the feedback codebook size is not determined based on PDCCH monitoring occasions. A set of possible PDSCH occasions may be determined by a UE on a per DL serving cell basis. As an illustrative example, a set of feedback delay values (e.g., K1 values {1, 2, 3, 4, 5, 6, 7, 8} if only DCI 1_0 is configured and DCI 1_1 is not configured in the serving cell) may be used to calculate the set of possible PDSCH occasions. If DCI format 1_1 is configured for the serving cell, then the feedback delay value K1 is provided by a value of a member of a set K1 values, such as by dl-DataToUL-ACK in a PUCCH-Config message. Additionally, if larger or extended feedback values (K1), such as more or larger K1 values than implemented in Release 15, are used, the feedback codebook size further increases because the set of K1 value is larger and/or has larger members.

A set of PDSCH Time domain resource allocation (TDRA) candidates (within a slot) denoted by R is also used in the calculation of the set of possible PDSCH occasions, as described further herein. The TDRA candidates (R) may come from a configurable TDRA table or a default TDRA table, such as a pdsch-AllocationList field. The set of TDRA candidates may also be configured in a PUCCH-Config message.

A HARQ-ACK feedback codebook may be arranged with acknowledgement feedback organized in a time-first (i.e., PDSCH occasion) and cell second manner. For example, ACK/NACK bits for slots that occur earlier in time are positioned before ACK/NACK bits for slots that occur later in time. To illustrate, ACK/NACK bits for slot 1 are positioned before slot 2. Additionally, within a given slot, ACK/NACK bits for cell 0 are positioned before ACK/NACK bits for cell 1. In some implementations, each PDSCH occasion may include multiple ACK/NACK bits. For example, the number of ACK/NACK (ACK/NACK bits) per PDSCH occasion per serving cell may depend on other configurations, such as a number of transport blocks (# TBs) per PDSCH (e.g., 1 or 2), a Code Block Group (CBG) configuration (e.g., 1, 2, 4, 8), etc., or a combination thereof.

After a feedback codebook is generated, e.g., after a codebook size is determined, the UE inserts or populates the feedback codebook with acknowledgement feedback for PDSCH occasions based on receipt of a downlink control message (e.g., DCI) and successful decoding of the corresponding PDSCH indicated by the ACK/NACK. For example, the UE inserts an (actual) ACK/NACK for a PDSCH occasion if the UE receives a DCI that indicates to the UE to feedback an ACK/NACK for the PDSCH in the PUCCH slot (e.g., slot n); otherwise, the UE generates a (dummy) NACK if no DCI is received (i.e., if a DCI is missed or not sent). The UE generates an (actual) NACK if decoding of a PDSCH fails when a DCI is received. The UE reporting NACKs (e.g., dummy NACKs) is robust against missing DCIs.

Accordingly, the size of the feedback codebook can become large because of NR-U slot configurations are likely to have less uplink slots to provide feedback (e.g., to limit LBT gaps), may have extended feedback delay values, and many optional features of the NR-U mode can each double, triple, quadruple, etc., the size of the codebook. To illustrate, large feedback delay values, use of mini-slots (i.e., more than 1 PDSCH occasion per slot), multiple serving cells (CCs), higher CBG configurations, or a combination thereof, all result in increased to codebook size (e.g., multiplication thereof).

While such a feedback codebook is robust, the feedback codebook includes possible PDSCH occasions instead of actual or scheduled PDSCH occasions. Accordingly, the size of the feedback codebook may be reduced to remove at least some of the possible PDSCH occasions and at least a portion of the feedback codebook may be based on actually scheduled PDSCH occasions. Reducing a size of the feedback codebook reduces overhead costs, increases throughput, and reduces latency.

A size of a feedback codebook may be reduced in multiple ways according to concepts of the present disclosure. For example, the feedback codebook may be generated with a reduced size, as compared to conventional semi-static feedback codebooks or by ignoring or not including some of the possible PDSCH occasions for a portion of a window. Additionally, or alternatively, a size of a feedback codebook may be reduced after generation. For example, the size of the codebook is first generated based on possibly scheduled PDSCH occasions for the window. During operation, and possibly responsive to receiving an indication, the size of the codebook is reduced based on actually scheduled PDSCH occasions for at least a portion of the window (i.e., some of the possible PDSCH occasions are ignored or excluded). The actually scheduled PDSCH occasions may be indicated by a serving cell and represent a subset of occasions of the possible (e.g., all potential locations or occasions for) PDSCH to occur in the window.

One example of generating a reduced codebook size is by ignoring PDSCH occasions based on identifying COTs. As mentioned above, when operating in a NR-U mode LBT rules may specify channel downtime where a transmitter, such as a serving cell or gNB, does not (is not allowed) to transmit. For example, an LBT gap may be inserted between two COTs. A COT may be defined as a string of continuous one way communications, such as multiple contiguous DL or UL designated slots. The COTs may be determined by DeModulation Reference Signal (DMRS) detection by the UE, COT length indication through system information, etc. In between such contiguous DL or UL designated slots, LBT rules may schedule an LBT gap that separates the two sequential COTs. A UE may ignore possible PDSCH occasions that occur between to COTs to reduce the codebook size without sacrificing the robustness of the codebook.

Another example is generating a reduced codebook size or reducing a codebook size based on actually scheduled PDSCH occasions for at least the portion of the window. To illustrate, a cell (e.g., scheduling, scheduled, or a combination thereof) may indicate actually scheduled PDSCH occasions for at least the portion of the window in one or more downlink control messages (e.g., DCI). Such indication may be explicit, indicated in a downlink control message, or implicit, based on UE receipt of a downlink control message and possible reception of the corresponding PDSCH. Accordingly, the size of the codebook is generated or reduced based on the actually scheduled PDSCH occasions (i.e., some of the possible PDSCH occasions are ignored or excluded).

FIG. 5A illustrates an example transmission diagram for a window in which communications occur between one or more base stations (e.g., 105) and a UE (e.g., 115) each configured according to aspects of the present disclosure. The window may be defined by a maximum feedback delay value (K1), which as illustrated is in FIG. 5A is 3 and have a corresponding PUCCH for providing feedback. In FIG. 5A, a first cell (e.g., cell zero) is configured to use mini-slots, i.e., transmit multiple PDSCHs per slot of the window, and a second cell (e.g., cell one) is configured to utilize two transport blocks (TBs) per PDSCH.

During the window, two PDSCHs are received (i.e., mini-slot configuration enabled) at a UE during a first slot (n−3) of the window from the first cell (e.g., cell zero) and none are received from the second cell (e.g., cell one), one PDSCH is received in a second slot (n−2) of the window from the second cell, and one PDSCH is received in a third slot (n−1) of the window from the first cell. As illustrated in FIG. 5A, the PUCCH includes feedback information for both the first and second cells (e.g., cell zero and cell one). A corresponding feedback codebook 550 for acknowledging such PDSCH transmissions during the window in the PUCCH transmission is illustrated in FIG. 5B.

FIG. 5B illustrates that ACK/NACKs, also referred to as real ACK/NACKs, are inserted into the feedback codebook 550 when a PDSCH is received and that NACKs, also referred to as dummy NACKs, are inserted into the feedback codebook when a PDSCH is not received for a given slot (or mini-slot) for each cell. Accordingly, for the first cell, two ACK/NACKs are illustrated in the feedback codebook 550 for both mini-slots of the first slot and one ACK/NACK is illustrated in one of the two mini slots for the third slot, and for the second cell, only two ACK/NACKs are illustrated in both transport blocks (TBs) for the second cell. NACKs are included in the remaining positions of the feedback codebook 550. Thus, as illustrated in FIG. 5B, a feedback codebook 550 may include many entries for possible PDSCH occasions or unused PDSCH occasions, i.e., indicated by NACKs.

Figure 6A:
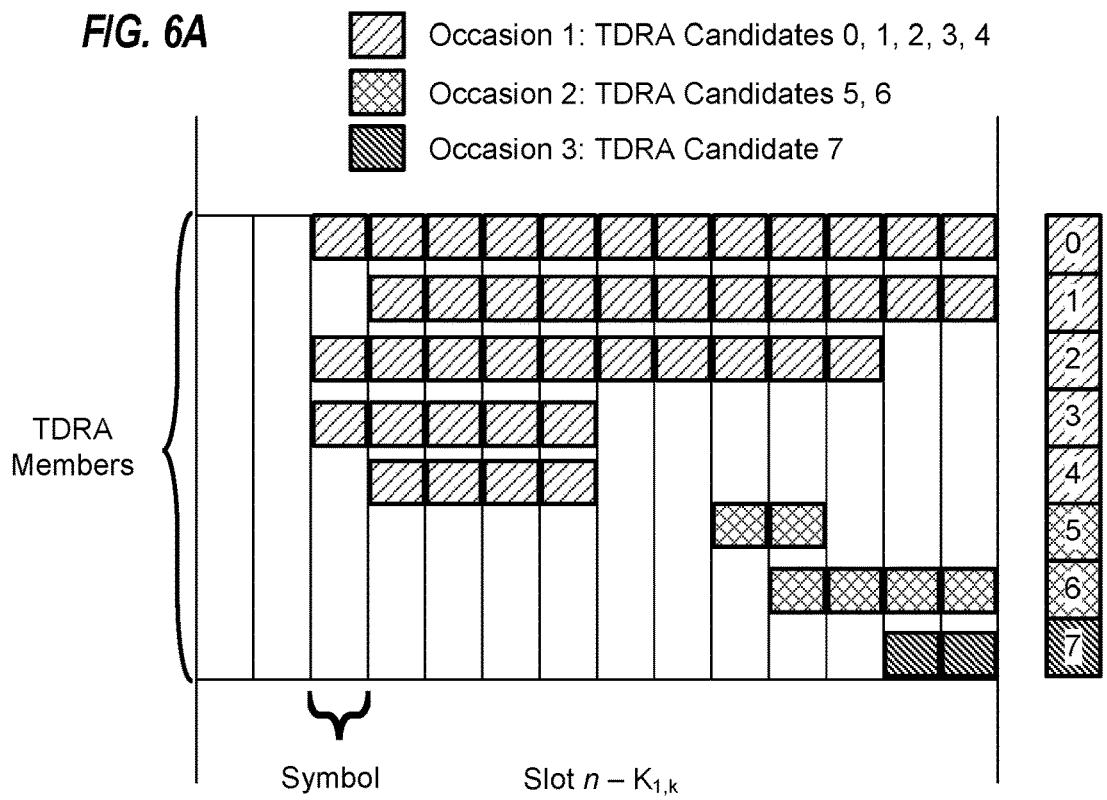
FIG. 6A is a schematic diagram illustrating an example resource grid for one slot of a subframe.

FIG. 6A is a schematic diagram illustrating an example resource grid for one slot of a subframe. The schematic diagram illustrates 14 columns which represent symbols for the slot (slot n−$K_{1,k}$) and 8 rows representing members of a TDRA table Each row (e.g., each member or TDRA candidate (R)) determines a starting symbol and length for a possible PDSCH. TDRA candidates (R) of the TDRA Table are divided into groups where each group represents a PDSCH occasion. In the exemplary schematic diagram, three PDSCH occasions are identified with corresponding TDRA candidates (R). As illustrated in FIG. 6A, a first PDSCH occasion includes TDRA candidates 0-4, a second PDSCH occasion include TDRA candidates 5 and 6, and a third PDSCH occasion includes TDRA candidate 7.

A set of possible PDSCH occasion for a particular cell may be determined based on the K1 values and the TDRA candidates. For example, a set of PDSCH occasions is initialized as an empty set ($M_{A,C}$). For each K1 value of a set of possible K1 values, a number of PDSCH occasions may be determined by evaluating a set of TDRA candidates to remove all TDRA candidates in a slot (e.g., slot n−$K_{1,k}$) that conflicts (by at least 1 symbol) with a corresponding TDD UL/DL configuration. Additionally, remaining PDSCH TDRA candidates are considered by adding one PDSCH occasion to the set corresponding to the slot if the UE does not indicate a capability to receive more than one unicast PDSCH per slot (i.e., no multiple mini-slots per slot) and if the TDRA candidate R set is not-empty (i.e., a possible TDRA candidate exits). In the alternative, such as if a capability to receive multiple mini-slots per slot is indicates, the set of TDRA candidates is partitioned into subgroups of TDRA candidates, where the number of subgroups is a maximum number of possible non-overlapping PDSCH receptions per slot based on rows of the TDRA candidates R and where each subgroup represents a PDSCH occasion in the slot.

Figure 6B:
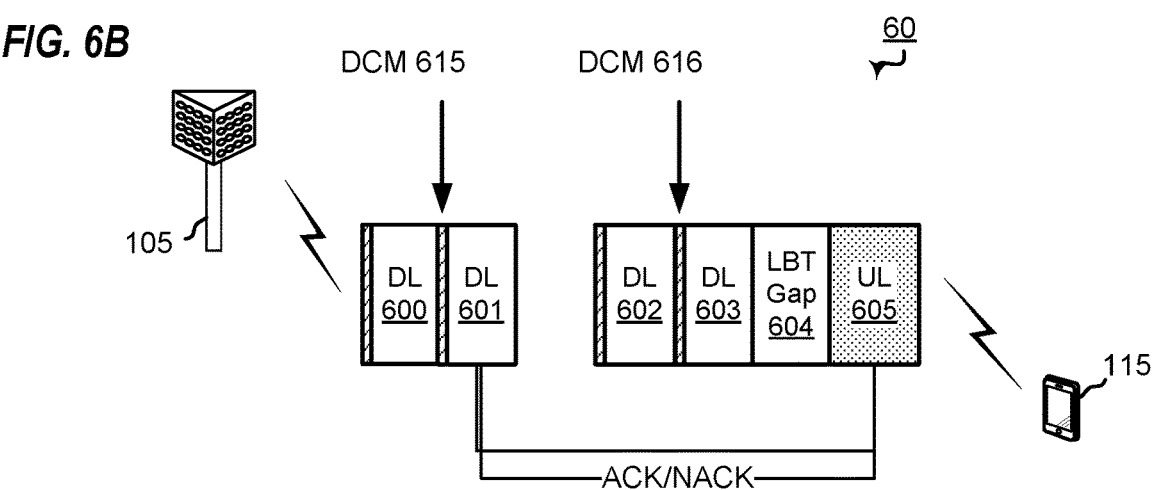
FIG. 6B is a block diagram illustrating an exemplary portion of an NR network in which communications occur between a base station and UE.

FIG. 6B is a block diagram illustrating a portion of NR network 60 in which communications occur between base station 105 and UE 115 each configured according to aspects of the present disclosure. NR network 60 may include unlicensed or contention-based spectrum, such as in NR-U or NR-SS operations. Network nodes, such as base station 105 and UE 115, may first perform a successful listen before talk (LBT) procedure prior to transmission on the shared spectrum. The communications illustrated between base station 105 and UE 115 includes multiple transmission opportunities (TxOPs) or channel occupancy times (COTs) including downlink and uplink slots 600-603 and 605 and a LBT gap 604 between contiguous downlink slots 600-603 and uplink slot 605.

At downlink control message 615, base station 105 identifies or indicates a delay value in a field for an acknowledgement delay to identify acknowledgement resources for upcoming downlink transmissions. The delay value may include or correspond to a PDSCH slot-to-HARQ-ACK-delay value. A PDSCH slot-to-HARQ-ACK-delay value signifies to UE 115 when, i.e., which slot after the PDSCH to transmit the acknowledgement feedback for the PDSCH.

In some implementations, the downlink control message 615 identifies an extended feedback delay for providing acknowledgement feedback for HARQ processes. For example, the downlink control message 615 indicates to UE 115 that another field (e.g., a PRI field) of the downlink control message 615 is used, alone or in combination with the K1 field to indicate the extended feedback delay value. Accordingly, the UE 115 may determine the acknowledgement resources for the PDSCH for providing acknowledgement feedback for HARQ processes for the PDSCH for slots more than 7 or 8 frames (or 15 frames if an RRC set is being used, such as in Release 15, DCI format 1_1) in the future, such as uplink slot 605.

Additionally, in some implementations of the present aspects, one or more of the downlink control messages 615 or 616 include a field or indicator, such as a multiple PDSCH indicator field, configured to indicate whether multiple PDSCHs are actually scheduled or were actually sent by a serving cell, as described with reference to FIG. 6C.

Figure 6C:
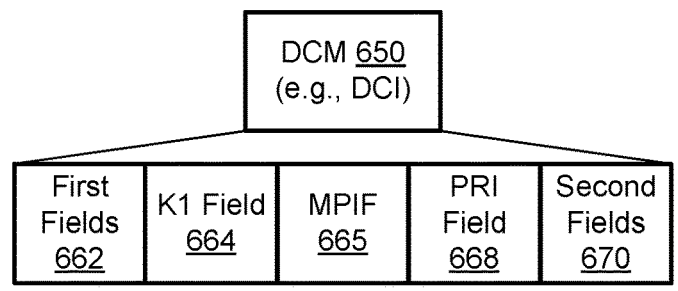
FIG. 6C is a schematic diagram illustrating an example of downlink control message including fields thereof.

FIG. 6C illustrates an example field layout of a downlink control message 650. The downlink control message 650 may include or correspond to the downlink control message 615 or 616 of FIG. 6B. The downlink control message 550 includes one or more fields 560. As illustrated in FIG. 6C, the downlink control message 650 is a DCI. A DCI (or DCI message) may have multiple different types or formats, such as Format 0_0, 0_1, 1_0, 1_1, etc. In the example illustrated in FIG. 6C, the downlink control message 650 includes one or more first fields 662, a feedback timing indicator field 664 (also referred to herein as a K1 field), a multiple PDSCH indicator field (MPIF) 665, a PUCCH Resource Indicator (PRI) field 668, and one or more second fields 670. The one or more fields 662 and 670 may be optional.

The feedback timing indicator field 664 identifies or indicates a feedback timing indicator value (K1). The feedback timing indicator field 664 may include or correspond to a PDSCH-to-HARQ_feedback timing indicator field. In a particular implementation, the feedback timing indicator field 664 is a 3 bit field and is configured to indicate a reserved value.

The feedback timing indicator field 664 may indicate a feedback delay value (e.g., HARQ-ACK feedback delay value) directly. For example, a value of the feedback timing indicator field 664, i.e., a value identified by bits thereof, is or indicates the feedback timing indicator value (K1). To illustrate, a bit sequence of 111 illustrates a delay of 7 when the feedback timing indicator field 664 is configured to indicate a reserved value.

The feedback timing indicator field 664 may indicate a feedback delay value (e.g., HARQ-ACK feedback delay value) indirectly, i.e., identify a feedback delay value by indicating a member of set. For example, a value of the feedback timing indicator field 664, i.e., a value identified by bits thereof, indicates a particular member of a set of delay values, and a value (e.g., a second value) of the particular member indicates the feedback timing indicator value (K1). To illustrate, a bit sequence of 111 illustrates an $8^{th}$ member of a set.

In other implementations, the feedback timing indicator field 664 is configured to indicate that no delay value is indicated or indicates to use another field of the downlink control message 650, such as the PRI field 668, to identify an extended feedback delay value. In a particular implementation, the feedback timing indicator field 664 jointly identifies or indicates an extended feedback delay value along with another field of the downlink control message 650, such as the PRI field 668. In conventional NR and NR-U implementations, the PRI field 668 indicates PUCCH resources. For example, the PRI field 668 indicates a PUCCH resource of a PUCCH resource set.

In some implementations of the present aspects, the downlink control message 650 includes the MPIF 665. The MPIF 665 provides an indication relating to whether multiple PDSCHs are actually scheduled (or were actually sent) for at least one slot of a window. Such an indication may be referred to as explicit indication. For example, a 1 bit field can be used to indicate that multiple PDSCHs are actually scheduled for at least one slot of a window for a first bit value, such as by a bit value of 1, and can be used to provide no indication for a second bit value (e.g., 0). Alternatively, the second bit value can positively indicate that multiple PDSCHs are not actually scheduled for at least one slot of a window or that only single PDSCHs are actually scheduled for each slot of the window.

Such an indication enables reduction of a size of a feedback codebook. For example, a UE operating in a mode where multiple PDSCHs can be received per slot (e.g., a mini-slot mode), can be configured such that the UE reduces a size of a feedback codebook to eliminate or ignore acknowledgement feedback for at least a portion of the window responsive to not receiving an positive indication in a MPIF 665 from any DCM 650 corresponding to the window. Accordingly, the UE can reduce a size of the feedback codebook unless the base station explicitly indicates multiple PDSCHs are actually scheduled or were actually sent.

As another example, the MPIF 665 is a multiple bit field (e.g., a bitmap) and can be used to indicate whether multiple PDSCHs are actually scheduled multiple slots of a window. To illustrate, the bitmap includes a bit for each slot of at least a portion of the window and each bit indicates whether the corresponding slot has multiple PDSCHs actually scheduled.

Although the fields of DCM 650 are illustrated in a particular order, the fields may be positioned in other orders within DCM 650. For example, although the feedback timing indicator field 664 is illustrated as being separate from the PRI field 668, the fields 664 and 668 may be contiguous fields. Additionally or alternatively, one or more of fields 664, 665, or 668 may be a first field or a last field.

Figure 7A:
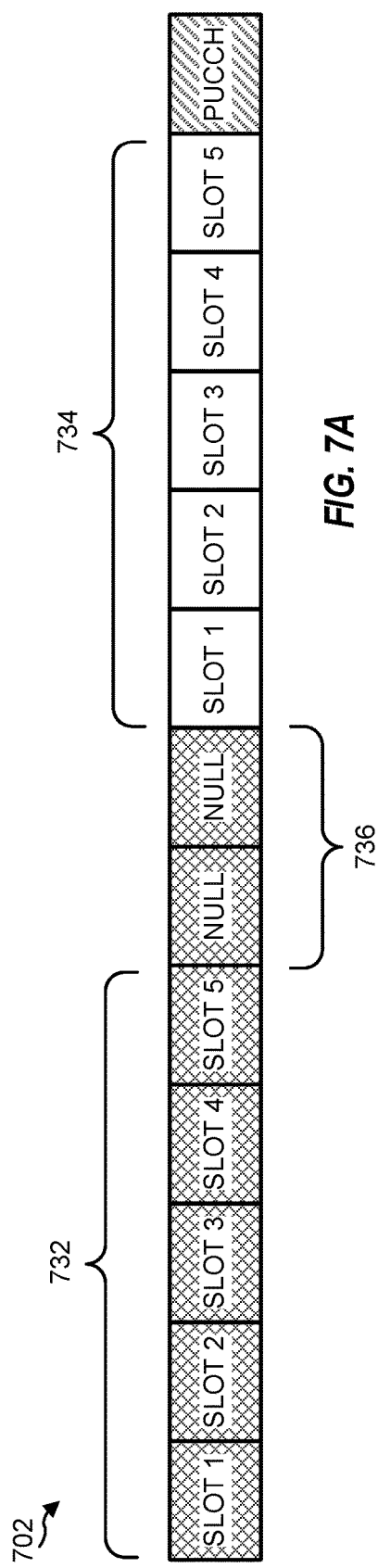
FIGS. 7A-7C are each an example of a block diagram illustrating excluded PDSCH occasions of a feedback codebook according to aspects of the present disclosure.
Figure 7B:
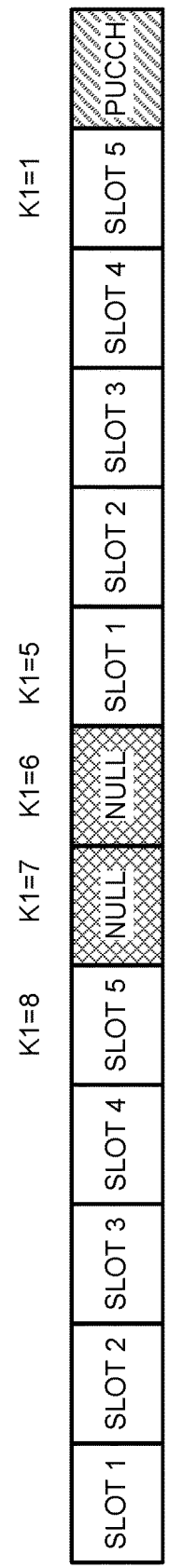
Figure 7C:
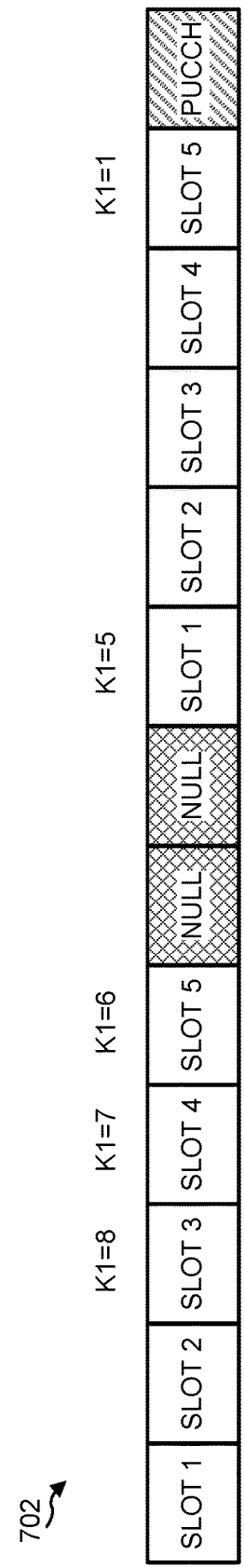

FIGS. 7A-7C illustrate examples of possible PDSCH occasions included in the feedback codebooks (e.g., 550) described herein, such as reduced size feedback codebooks. FIGS. 7A-7C illustrate examples of generating reduced size feedback codebooks that exclude acknowledgement feedback for possible PDSCH occasions that occur between COTs. FIGS. 8A and 8B illustrate other examples of generating reduced size feedback codebooks or reducing a size of a generated feedback codebook based on actually scheduled PDSCH occasions.

FIGS. 7A-7C each illustrate a block diagram that depicts (by cross-hatching) a portion of window where a UE ignores possible PDSCH occasions when generating or populating a feedback codebook. FIG. 7A illustrates a first example where only PDSCH occasions in a current COT are considered. Any PDSCH occasion that falls outside the current COT (e.g., a last COT of a window) may be ignored. In FIG. 7A, a window includes a plurality of slots 702. A first COT of the window includes 5 slots and is indicated by 732, and a second COT (e.g., a last or current COT) of the window includes 5 slots and is indicated 734. In other implementations, the COTs 732, 734 or the window may include a different number of slots. The first and second COTs 732 and 734 are separated by an LBT gap 736.

The UE determines all possible PDSCH occasions of the window based on feedback timing values and TDRA candidates, as described above. The UE also identifies the one or more COTs 732, 734, as described above, and removes PDSCH occasions corresponding to the first COT 732 (e.g., all PDSCH occasions not corresponding to the current or last COT, second COT 734) from the possible PDSCH occasions of the window. Accordingly, the UE generates a feedback codebook based on possible PDSCH occasions of the second COT 734.

FIG. 7B illustrates a second example where possible PDSCH occasions in multiple COTs of a window are considered and possible PDSCH occasions that fall between two COTs are excluded. Similar to FIG. 7A, the UE determines possible PDSCH occasions of the window, and the UE excludes possible PDSCH occasions that fall between two COTs, COTs 732 and 734. Accordingly, the UE generates a feedback codebook on possible PDSCH occasions of the first and second COTs 732 and 734. In FIG. 7B, feedback timing delay values (K1) are interpreted by the UE as including slots or PDSCH occasions that fall between the COTs 732, 734.

FIG. 7C is a third example of a block diagram where only PDSCH occasions in the multiple COTs are considered and possible PDSCH occasions that fall between two COTs are ignored. Accordingly, as in FIG. 7B, the UE generates a feedback codebook on possible PDSCH occasions of the first and second COTs 732 and 734. However, in FIG. 7C, feedback timing delay values (K1) are interpreted by the UE as not including slots or PDSCH occasions that fall between the COTs 732, 734. Accordingly, as illustrated in FIGS. 7B and 7C, K1 values can indicate longer delays in FIG. 7C as a UE skips or does not consider slots in between COTs, such as LBT gap 736, when determining when to send acknowledgement feedback.

FIGS. 8A and 8B illustrate a portion of an NR network in which communications occur between a base station and UE each configured according to aspects of the present disclosure. FIGS. 8A and 8B illustrate explicit indication of actual scheduling of PDSCH occasions for which a size of a feedback codebook can be reduced. Explicit indication is where a cell explicitly indicates actual scheduled PDSCHs by one or more downlink control messages 822 (e.g., DCI), and the UE generates the feedback codebook based on the actually scheduled PDSCH occasion rather than the possible PDSCH occasions. Explicit indication of actual scheduled PDSCH by downlink control messages 822 can be indicated in multiple ways as illustrated in FIGS. 8A and 8B.

As illustrated in FIG. 8A, the communications illustrated between base station and UE includes multiple transmission opportunities (TxOPs) or channel occupancy times (COTs) including a plurality of slots 802 of a window 810, such as a window for providing HARQ feedback. The UE may receive one or more downlink control messages 822 (e.g., 822a, 822b, etc.) during the window which indicate that multiple PDSCHs are actually scheduled for one or more slots of the window 810. In FIG. 8A, a first downlink control message 822a is received during a first slot (n−6) and second downlink control message 822b is received during a fourth slot (n−3). The first downlink control message 822a may include a first indicator and the second downlink control message 822b may include a second indicator. The indicators (e.g., bit values) may be included in and indicated by a MPIF 665 (FIG. 6C).

For example, in some implementations, one bit in the first downlink control message 822a provides an indication of actually scheduled PDSCHs. To illustrate, a first bit value of the first indicator indicates multiple PDSCHs are actually scheduled for one or more slots of the window 810. Accordingly, the UE may not reduce a feedback codebook size based on the first indicator. Thus, the UE can reduce a feedback codebook size in other instances where a first indicator is not received in a downlink control message 822 corresponding to the window 810.

Additionally, or alternatively, a second bit value of the second indicator may indicate that no multiple PDSCHs are actually scheduled for window 810. Thus, the UE may reduce a feedback codebook size based on the second indicator. In other implementations, the second bit value of the second indicator may indicate that no multiple PDSCHs are actually scheduled for the slot in which the second indicator was received (e.g., the fourth slot, n−3) and optionally, for each of the remaining slots.

As another example, a downlink control message 822 may include a bitmap (i.e., multiple bits). To illustrate, a single downlink control message may include a bitmap which indicates if more than one PDSCH per slot is actually scheduled by the gNB in multiple slots of the window 810. Thus, the first downlink control message 822a may include the bitmap which provides the indications of multiple PDSCH for each slot of the window 810. In some implementations, the UE may receive a second downlink control message 822b that overrides the first downlink control message 822a. To illustrate, the bitmaps of the two downlink control messages 822a and 822b are different and the UE generates the codebook size based on the second or last received downlink control message 822, i.e., second downlink control message 822b.

When explicit indication is being used, the indication may be provided by one or more serving cells and the indication may effect one or more serving cells. For example, an indication may only apply to a scheduling serving cell, the indication may only apply to a scheduled serving cell, or the indication may apply to all cells of a particular type, or the indication may apply to all cells of any type.

FIG. 8B illustrates subgroups of a window, such a window 810. In FIG. 8B, the window may be defined by a feedback timing field (e.g., indicated or identified by a parameter or value thereof, such as K1) and can be divided into multiple groups 812, 814. Similar to the methods described above in FIG. 8A, the UE can determine acknowledgement feedback for each group 812, 814 of the window separately. To illustrate, the UE determines separately for each group 812, 814 whether to consider only one PDSCH occasion per slot or multiple PDSCH occasions per slot. For example, a first downlink control message 822a provides an indication, as described in FIG. 8A, for group 812, and a second downlink control message 822b provides an indication, as described in FIG. 8A, for group 814. Accordingly, the UE can generate a reduced feedback codebook for the window even though multiple PDSCHs are actually scheduled in a group of the window.

Segmenting a window into multiple groups 812, 814 can be beneficial when the UE is operating in a NR-U mode because it is likely in such a mode that "mini-slots," i.e., multiple PDSCHs will actually be scheduled and utilized in a beginning of a window or a COT and multiple PDSCH may not be utilized in time slots later in the window or the COT.

In a particular implementation, the window can be subdivided to such an extent that each slot corresponds to a "group." Accordingly, in such implementations, the UE can determine whether multiple PDSCH occasions are actually scheduled for each slot in the window.

Figure 14:
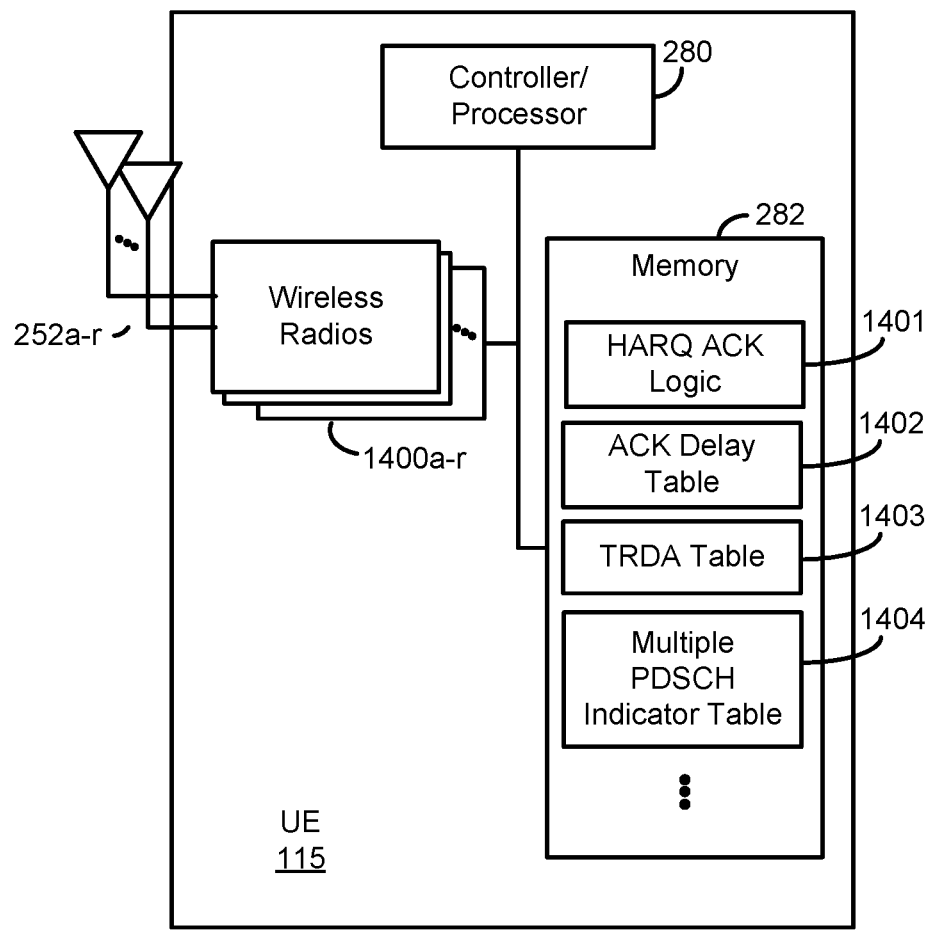
FIG. 14 is a block diagram conceptually illustrating a design of a UE according to some embodiments of the present disclosure.

FIG. 9 is a block diagram illustrating example blocks executed by a UE configured according to an aspect of the present disclosure. The example blocks will also be described with respect to UE 115 as illustrated in FIG. 14. FIG. 14 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1400*a*-*r* and antennas 252*a*-*r*. Wireless radios 1400*a*-*r* includes various components and hardware, as illustrated in FIG. 2 for UE 115, including modulator/demodulators 254*a*-*r*, MIMO detector 256, receive processor 258, transmit processor 264, and TX MIMO processor 266.

At block 900, a UE identifies a window for providing acknowledgement feedback in a Physical Uplink Control Channel (PUCCH). A UE, such as UE 115, may execute, under control of controller/processor 280, HARQ acknowledgement logic 1401, stored in memory 282. The execution environment of HARQ acknowledgement logic 1401 provides the functionality for UE 115 to define and perform the HARQ acknowledgement procedures. The execution environment of HARQ acknowledgement logic 1401 defines the different HARQ processes. One exemplary HARQ process is receiving control information from a serving base station related to the HARQ processes, such as in receiving and decoding the relevant information from the downlink control message (e.g., DCI). As UE 115 receives the downlink control message via antennas 252*a*-*r* and wireless radios 1400*a*-*r*, UE 115 identifies the fields (e.g., K1 field 664, MPIF 665, PRI field 668, etc.) contained therein and the corresponding values of the fields. The execution environment of HARQ acknowledgement logic 1401 also identifies the window and/or the PUCCH timing based on received system information, control information, or both.

At block 901 and 902, the UE identifies possible Physical Downlink Shared Channel (PDSCH) occasions of the window based on at least a set of feedback timing delay values and a set of Time Domain Resource Allocation (TDRA) candidates (block 901), and identifies one or more channel occupancy times (COTs) of the window (block 902). The execution environment of HARQ acknowledgement logic 1401 provides UE 115 the functionalities described with respect to the various aspects of the present disclosure. UE 115 may obtain the acknowledgement resource associated with the HARQ processes either directly or indirectly. Within the execution environment of HARQ acknowledgement logic 1401, UE 115, under control of controller/processor 280, identifies the possible Physical Downlink Shared Channel (PDSCH) occasions of the window based on a set of feedback timing delay values of an acknowledgement delay table 1402 (ACK delay table) and based on a set of Time Domain Resource Allocation (TDRA) candidates of a TDRA Table 1403, in memory 282. In a particular implementation the ACK delay table 1402 may correspond to an RRC set and may be configured by a base station. Additionally, UE 115, under control of controller/processor 280, identifies one or more channel occupancy times (COTs) of the window based on DMRS detection, COT length indication through system information (SI) to the UE 115, or another process.

At block 903, the UE generates a feedback codebook for the window, the feedback codebook having a size based on acknowledgement feedback for first possible PDSCH occasions that occur during the identified one or more COTs of the window of the possible PDSCH occasions of the window. The execution environment of HARQ acknowledgement logic 1401 provides UE 115 the functionalities described with respect to the various aspects of the present disclosure. Within the execution environment of HARQ acknowledgement logic 1401, UE 115, under control of controller/processor 280, identifies a subset of the possible PDSCH occasions of the window that occur outside of the identified one or more COTs. The UE 115 does not consider the subset of the possible PDSCH occasions when generating a size of the feedback codebook or refrains from including acknowledgement feedback for the subset of the possible PDSCH occasions in the feedback codebook.

Additionally, the UE may transmit the acknowledgement feedback of the feedback codebook in the PUCCH. Once UE 115 generates and populates the feedback codebook acknowledgement feedback at block 903, UE 115 may transmit the acknowledgement feedback (e.g., ACK or NACK) for one or more HARQ processes via wireless radios 1400*a*-*r* and antennas 252*a*-*r*.

Figure 15:
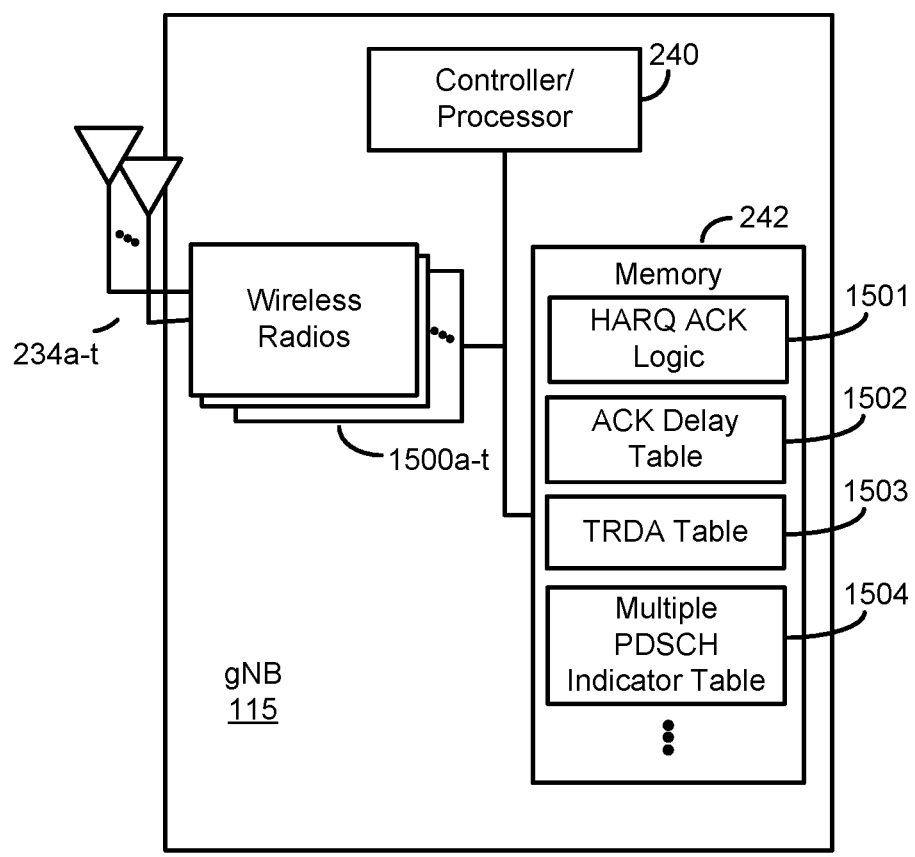
FIG. 15 is a block diagram conceptually illustrating a design of a base station configured according to some embodiments of the present disclosure.

FIG. 10 is a block diagram illustrating example blocks executed by a base station configured according to an aspect of the present disclosure. The example blocks will also be described with respect to gNB 105 (or eNB) as illustrated in FIG. 15. FIG. 15 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1500*a*-*t* and antennas 234*a*-*r*. Wireless radios 1500*a*-*t* includes various components and hardware, as illustrated in FIG. 2 for gNB 105, including modulator/demodulators 232*a*-*t*, MIMO detector 236, receive processor 238, transmit processor 220, and TX MIMO processor 230.

At block 1000, a gNB transmits data during one or more channel occupancy times (COTs) of a window. A gNB, such as gNB 105, may execute, under control of controller/processor 240, HARQ acknowledgement logic 1501, stored in memory 242. The execution environment of HARQ acknowledgement logic 1501 provides the functionality for gNB 105 to define and perform the HARQ acknowledgement procedures. The execution environment of HARQ acknowledgement logic 1501 defines the different HARQ processes. One exemplary HARQ process is generating control information related to the HARQ processes, such as in encoding and transmitting a feedback delay value in the downlink control message (e.g., DCI). As gNB 105 generates and transmits the downlink control message via antennas 234*a*-*t* and wireless radios 1500*a*-*t*, the gNB 105 encodes values for the fields of the downlink control message, such as the K1 field 664 and the PRI field 668. Within the execution environment of HARQ acknowledgement logic 1501, gNB 105, under control of controller/processor 240, encodes the K1 field 664 and/or the PRI field 668 (FIG. 6C) using an acknowledgement delay table 1502, in memory 242. After transmission of a downlink control message, the gNB 105 generates and transmits the data, such as in a PDSCH, via antennas 234*a*-*t* and wireless radios 1500*a*-*t*.

At block 1001, the gNB receives a feedback codebook for the data transmitted during the window, the feedback codebook having a size based on acknowledgement feedback for first possible PDSCH occasions that occur during the one or more COTs of the window of second possible PDSCH occasions of the window. The gNB 105 may receive the feedback codebook, such as the acknowledgement feedback (e.g., ACK or NACK) thereof, for the delayed HARQ processes via wireless radios 1500*a-t* and antennas 234*a-t* at the time, i.e., slot, identified by the K1 field 664 and/or the PRI field 668 (FIG. 6C). Accordingly, a gNB can receive reduced acknowledgement feedback by not receiving acknowledgement feedback for possible PDSCH occasions that occur outside COTs. Therefore, overhead costs can be reduced.

In some implementations, the gNB compares the received acknowledgement feedback to data sent by the gNB to determine if the UE successfully received the data. Within the execution environment of HARQ acknowledgement logic 1501, gNB 105 compares acknowledgement feedback received via antennas 252*a-r* and wireless radios 1500*a-t* to data sent via antennas 252*a-r* and wireless radios 1500*a-t* to determine if a portion of the data needs to be present. In some implementations, the gNB 105 generates a feedback codebook and compares a generated feedback codebook to a received feedback codebook, such as comparing the acknowledgement feedback data thereof.

Figures 11, 12:
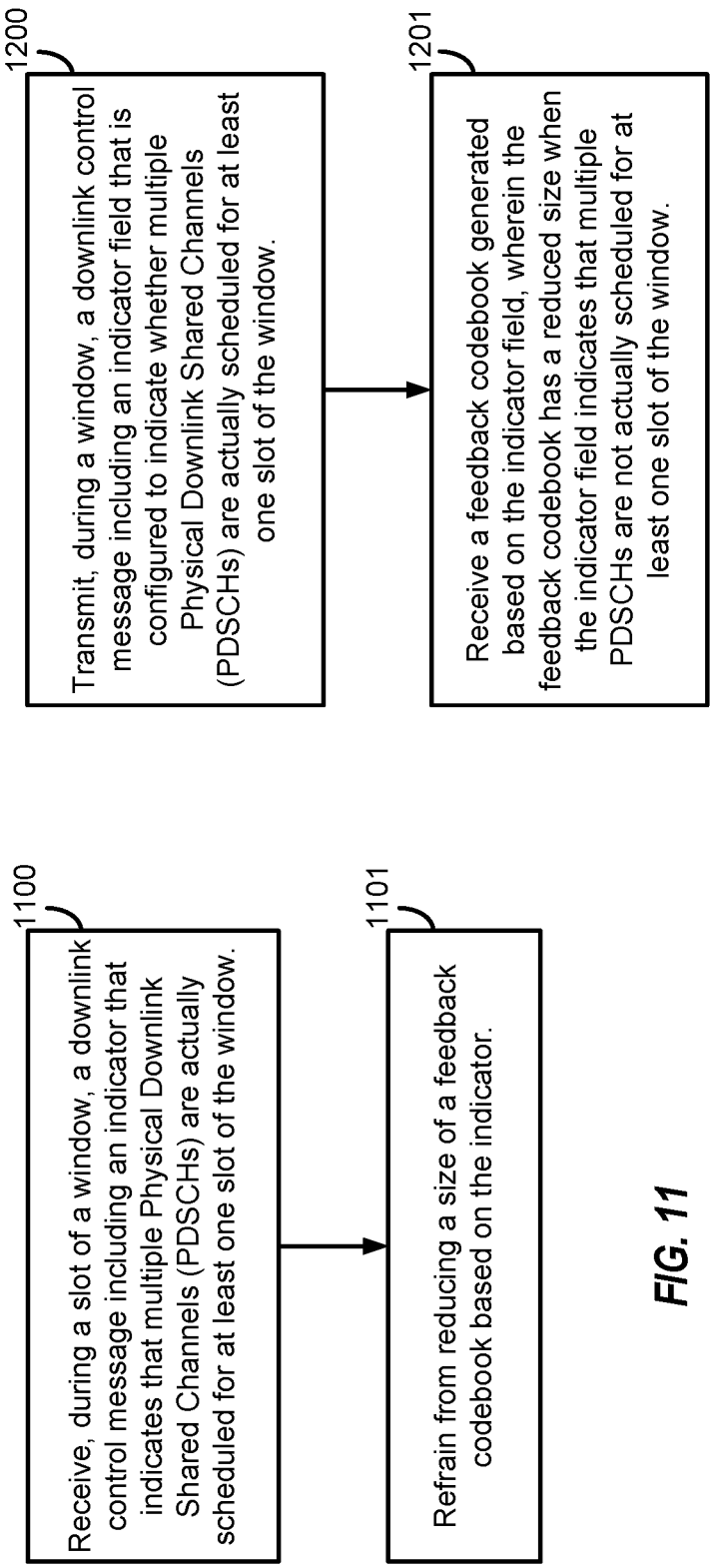
FIG. 11 is a block diagram illustrating another example of blocks executed by a UE configured according to an aspect of the present disclosure.
FIG. 12 is a block diagram illustrating another example of blocks executed by a base station configured according to an aspect of the present disclosure.

FIG. 11 is a block diagram illustrating example blocks executed by a UE configured according to an aspect of the present disclosure similar to FIG. 9 and describes reducing a size of a feedback codebook during operation (e.g., after a codebook size has been determined or preliminarily determined). In FIG. 11, the example blocks will also be described with respect to UE 115 as illustrated in FIG. 14.

At block 1100, a UE receives, during a slot of a window, a downlink control message including an indicator that indicates that multiple Physical Downlink Shared Channels (PDSCHs) are actually scheduled for at least one slot of the window. A UE, such as UE 115, may execute, under control of controller/processor 280, HARQ acknowledgement logic 1401, stored in memory 282. The execution environment of HARQ acknowledgement logic 1401 provides the functionality for UE 115 to define and perform the HARQ acknowledgement procedures. The execution environment of HARQ acknowledgement logic 1401 defines the different HARQ processes. One exemplary HARQ process is receiving control information from a serving base station related to the HARQ processes, such as in receiving and decoding the relevant information from the downlink control message (e.g., DCI). As UE 115 receives the downlink control message via antennas 252*a-r* and wireless radios 1400*a-r*, UE 115 identifies the fields (e.g., K1 field 664, PRI field 668, a multiple PDSCH indicator field, etc.) contained therein and the corresponding values of the fields.

At block 1101, the UE refrains from reducing a size of a feedback codebook based on the indicator. The execution environment of HARQ acknowledgement logic 1401 provides UE 115 the functionalities described with respect to the various aspects of the present disclosure. UE 115 may obtain the acknowledgement resource associated with the HARQ processes either directly or indirectly. Within the execution environment of HARQ acknowledgement logic 1401, UE 115, under control of controller/processor 280, checks the identified values of the fields against the ACK delay table 1402, in memory 282. UE 115 then determines that a particular value of a multiple PDSCH indicator field indicates to not reduce a size of the feedback codebook. Reducing the size of the feedback codebook includes excluding acknowledgement feedback for multiple (e.g., additional) PDSCHs for one or more slots of the window when the UE receives an indication that multiple PDSCHs are not actually scheduled for the one or more slots.

Additionally, the UE may transmit the acknowledgement feedback of the feedback codebook in a PUCCH. Once UE 115 generates and populates the feedback codebook with the acknowledgement feedback, the UE 115 may transmit the acknowledgement feedback (e.g., ACK or NACK) for one or more HARQ processes via wireless radios 1400*a-r* and antennas 252*a-r*.

In other implementations, the UE may determine whether one or more downlink control messages include an indicator that indicates whether multiple PDSCHs are scheduled for at least one slot of the window and may reduce a size of the feedback codebook based on determining that the one or more downlink control messages do not include the indicator.

The execution environment of HARQ acknowledgement logic 1401 provides UE 115 the functionalities described with respect to the various aspects of the present disclosure. Within the execution environment of HARQ acknowledgement logic 1401, UE 115, under control of controller/processor 280, checks values of an indicator field (e.g., a multiple PDSCH indicator field) against a multiple PDSCH Indicator Table 1404, in memory 282. The multiple PDSCH indicator field (e.g., 665) may be 1 bit or multiple bits (e.g., a bitmap). Tables 1502-1504 may include or correspond to tables 1402-1404.

Figure 13:
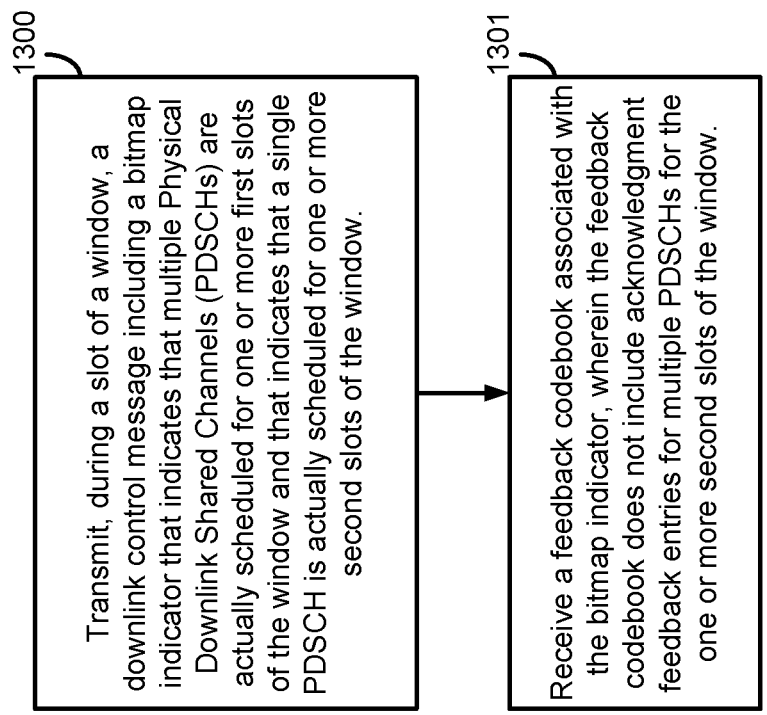
FIG. 13 is a block diagram illustrating yet another example of blocks executed by a base station configured according to an aspect of the present disclosure.

Similarly, FIGS. 12 and 13 are other examples of block diagrams illustrating example blocks executed by a base station configured according to an aspect of the present disclosure similar to FIG. 10 and describe reducing a size of a feedback codebook during operation (e.g., after a codebook size has been determined or preliminarily determined).

FIG. 12 is a block diagram illustrating example blocks executed by a base station configured according to an aspect of the present disclosure. The example blocks will also be described with respect to gNB 105 (or eNB) as illustrated in FIG. 15. FIG. 15 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1500*a-t* and antennas 234*a-r*. Wireless radios 1500*a-t* includes various components and hardware, as illustrated in FIG. 2 for gNB 105, including modulator/demodulators 232*a-t*, MIMO detector 236, receive processor 238, transmit processor 220, and TX MIMO processor 230.

At block 1200, a gNB transmits, during a window, a downlink control message including an indicator field that is configured to indicate whether multiple Physical Downlink Shared Channels (PDSCHs) are actually scheduled for at least one slot of the window. A gNB, such as gNB 105, may execute, under control of controller/processor 240, HARQ acknowledgement logic 1501, stored in memory 242. The execution environment of HARQ acknowledgement logic 1501 provides the functionality for gNB 105 to define and perform the HARQ acknowledgement procedures. The execution environment of HARQ acknowledgement logic 1501 defines the different HARQ processes. One exemplary HARQ process is generating control information related to the HARQ processes, such as in encoding and transmitting a feedback delay value in the downlink control message (e.g., DCI). As gNB 105 generates and transmits the downlink control message via antennas 234*a-t* and wireless radios 1500a-t, the gNB 105 encodes values for the fields of the downlink control message, such as the K1 field 664 and the PRI field 668. Within the execution environment of HARQ acknowledgement logic 1501, gNB 105, under control of controller/processor 240, encodes the MPIF 665 using a multiple PDSCH Indicator Table 1504, in memory 242. After transmission of a downlink control message, the gNB 105 generates and transmits data, such as in a PDSCH, via antennas 234a-t and wireless radios 1500a-t.

At block 1201, the gNB receives a feedback codebook generated based on the indicator field, wherein the feedback codebook has a reduced size when the indicator field indicates that multiple PDSCHs are not actually scheduled for at least one slot of the window. The gNB 105 may receive the reduced feedback codebook, such as the acknowledgement feedback (e.g., ACK or NACK) thereof, for the delayed HARQ processes via wireless radios 1500a-t and antennas 234a-t at the time, i.e., slot, identified by the K1 field 664 and/or the PRI field 668 (FIG. 6C). Accordingly, by including an indicator in a downlink control message a gNB can signal actually scheduled PDSCH occasions and receive reduced acknowledgement feedback by not receiving acknowledgement feedback for some possible PDSCH occasions. Therefore, overhead costs can be reduced.

In some implementations, the gNB compares the received acknowledgement feedback to data sent by the gNB to determine if the UE successfully received the data. Within the execution environment of HARQ acknowledgement logic 1501, gNB 105 compares acknowledgement feedback received via antennas 252a-r and wireless radios 1500a-t to data sent via antennas 252a-r and wireless radios 1500a-t to determine if a portion of the data needs to be present. In some implementations, the gNB 105 generates a feedback codebook and compares a generated feedback codebook to a received feedback codebook, such as comparing the acknowledgement feedback data thereof.

FIG. 13 is a block diagram illustrating example blocks executed by a base station configured according to an aspect of the present disclosure. The example blocks will also be described with respect to gNB 105 (or eNB) as illustrated in FIG. 15. FIG. 15 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1500a-t and antennas 234a-r. Wireless radios 1500a-t includes various components and hardware, as illustrated in FIG. 2 for gNB 105, including modulator/demodulators 232a-t, MIMO detector 236, receive processor 238, transmit processor 220, and TX MIMO processor 230.

At block 1300, a gNB transmits, during a slot of a window, a downlink control message including a bitmap indicator that indicates that multiple Physical Downlink Shared Channels (PDSCHs) are actually scheduled for one or more first slots of the window and that indicates that a single PDSCH is actually scheduled for one or more second slots of the window. A gNB, such as gNB 105, may execute, under control of controller/processor 240, HARQ acknowledgement logic 1501, stored in memory 242. The execution environment of HARQ acknowledgement logic 1501 provides the functionality for gNB 105 to define and perform the HARQ acknowledgement procedures. The execution environment of HARQ acknowledgement logic 1501 defines the different HARQ processes. One exemplary HARQ process is generating control information related to the HARQ processes, such as in encoding and transmitting a feedback delay value in the downlink control message (e.g., DCI). As gNB 105 generates and transmits the downlink control message via antennas 234a-t and wireless radios 1500a-t, the gNB 105 encodes values for the fields of the downlink control message, such as the K1 field 664 and the PRI field 668. Within the execution environment of HARQ acknowledgement logic 1501, gNB 105, under control of controller/processor 240, encodes the K1 field 664 and/or the PRI field 668 (FIG. 6C) using an acknowledgement delay table 1502, in memory 242. Within the execution environment of HARQ acknowledgement logic 1501, gNB 105, under control of controller/processor 240, encodes the MPIF 665 using a multiple PDSCH Indicator Table 1504, in memory 242. After transmission of a downlink control message, the gNB 105 generates and transmits data, such as in a PDSCH, via antennas 234a-t and wireless radios 1500a-t.

At block 1301, the gNB receives a feedback codebook associated with the bitmap indicator, wherein the feedback codebook does not include acknowledgment feedback entries for multiple PDSCHs for the one or more second slots of the window. The gNB 105 may receive the feedback codebook, such as the acknowledgement feedback (e.g., ACK or NACK) thereof, for the delayed HARQ processes via wireless radios 1500a-t and antennas 234a-t at the time, i.e., slot, identified by the K1 field 664 and/or the PRI field 668 (FIG. 6C). Accordingly, by including a bitmap indicator in a downlink control message, a gNB can signal actually scheduled PDSCH occasions and receive reduced acknowledgement feedback by not receiving acknowledgement feedback for possible PDSCH occasions. Therefore, overhead costs can be reduced.

In some implementations, the gNB compares the received acknowledgement feedback to data sent by the gNB to determine if the UE successfully received the data. Within the execution environment of HARQ acknowledgement logic 1501, gNB 105 compares acknowledgement feedback received via antennas 252a-r and wireless radios 1500a-t to data sent via antennas 252a-r and wireless radios 1500a-t to determine if a portion of the data needs to be present. In some implementations, the gNB 105 generates a feedback codebook and compares a generated feedback codebook to a received feedback codebook, such as comparing the acknowledgement feedback data thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 4A, 4B, 9, 10, 11, 12, and 13) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
identifying, by a user equipment (UE), a window for providing acknowledgement feedback in a Physical Uplink Control Channel (PUCCH);
identifying, by the UE, possible Physical Downlink Shared Channel (PDSCH) occasions of the window based on at least a set of feedback timing delay values and a set of Time Domain Resource Allocation (TDRA) candidates;
identifying, by the UE, one or more channel occupancy times (COTs) of multiple COTs of the window; and
generating, by the UE, a feedback codebook for the window, the feedback codebook having a size based on acknowledgement feedback for first possible PDSCH occasions that occur during the identified one or more COTs of the window of the possible PDSCH occasions of the window.

2. The method of claim 1, wherein the size of the feedback codebook is generated independent of acknowledgement feedback for second possible PDSCH occasions that occur outside of the identified one or more COTs of the window of the possible PDSCH occasions of the window.

3. The method of claim 1, wherein the identified one or more COTs of the window comprise a last COT of the window, and wherein the first possible PDSCH occasions occur during the last COT.

4. The method of claim 1, wherein the first possible PDSCH occasions occur during a plurality of COTs of the multiple COTs of the window, and further comprising determining a feedback timing for transmission of the acknowledgement feedback of the feedback codebook based on a feedback timing value and the possible PDSCH occasions that occur during the window.

5. The method of claim 1, wherein the first possible PDSCH occasions occur during a plurality of COTs of the multiple COTs of the window, and further comprising determining a feedback timing for transmission of the acknowledgement feedback of the feedback codebook based on a feedback timing value and the first possible PDSCH occasions that occur during the plurality of COTs.

6. The method of claim 1, wherein identifying the possible PDSCH occasions includes calculating the possible PDSCH occasions per serving cell based on at least the set of feedback timing delay values, a number of PDSCH occasions per slot, and the set of TDRA candidates, and wherein the size of the feedback codebook is greater than four.

7. The method of claim 1, further comprising calculating the size of the feedback codebook based on multiplying a number of the first possible PDSCH occasions within the identified COTs, a number of transport block (TBs) per PDSCH, a number of code block groups (CBG), and a number of serving cells together.

8. The method of claim 1, further comprising:
receiving, by the UE during a slot of the window, a downlink control message including an indicator that indicates multiple PDSCHs are scheduled for at least one slot of the window; and
refraining, by the UE, from reducing the size of the feedback codebook based on the indicator.

9. The method of claim 1, further comprising:
receiving, by the UE during the window, one or more downlink control messages;
determining, by the UE, whether the one or more downlink control messages include a multiple PDSCH indicator that indicates whether multiple PDSCHs are scheduled for at least one slot of the window; and
reducing, by the UE, the size of the feedback codebook based on determining that the one or more downlink control messages do not include the multiple PDSCH indicator.

10. The method of claim 1, further comprising transmitting, by the UE, the acknowledgement feedback of the feedback codebook, wherein the acknowledgement feedback of the feedback codebook enables a serving cell to identify successful receipt and decoding of sent PDSCHs of the window by the UE.

11. The method of claim 1, further comprising:
identifying, by the UE, the first possible PDSCH occasions that occur during the identified one or more COTs of the window of the possible PDSCH occasions of the window, wherein the first possible PDSCH occasions correspond to a first subset of the possible PDSCH occasions of the window; and
identifying, by the UE, second possible PDSCH occasions of the possible PDSCH occasions of the window that occur outside of the identified one or more COTs of the window, wherein the second possible PDSCH occasions correspond to a second subset of the possible PDSCH occasions of the window.

12. The method of claim 1, further comprising determining the size of the feedback codebook based on a number of the first possible PDSCH occasions within the identified COTs, a number of transport block (TBs) per PDSCH, and a number of serving cells.

13. The method of claim 1, wherein the possible PDSCH occasions of the window include multiple Physical PDSCH occasions per slot for a particular serving cell.

14. The method of claim 1, wherein the window includes multiple subframes, and multiple slots per subframe of the multiple subframes, and wherein the window is defined by a maximum feedback delay value (K1).

15. An apparatus configured for wireless communication, the apparatus comprising:
at least one processor; and
a memory coupled to the at least one processor,
wherein the at least one processor is configured:
to identify a window for providing acknowledgement feedback in a Physical Uplink Control Channel (PUCCH);
to identify possible Physical Downlink Shared Channel (PDSCH) occasions of the window based on at least a set of feedback timing delay values and a set of Time Domain Resource Allocation (TDRA) candidates;
to identify one or more channel occupancy times (COTs) of multiple COTs of the window; and
to generate a feedback codebook for the window, the feedback codebook having a size based on acknowledgement feedback for first possible PDSCH occasions that occur during the identified one or more COTs of the window of the possible PDSCH occasions of the window.

16. The apparatus of claim 15, wherein the identified one or more COTs of the window comprise a last COT of the multiple COTs of the window, and wherein the first possible PDSCH occasions occur during the last COT.

17. The apparatus of claim 15, wherein the first possible PDSCH occasions occur during a plurality of COTs of the multiple COTs of the window, and wherein the at least one processor is further configured to determine a feedback timing for transmission of the acknowledgement feedback of the feedback codebook based on a feedback timing value and the possible PDSCH occasions that occur during the window.

18. The apparatus of claim 15, wherein the first possible PDSCH occasions occur during a plurality of COTs of the multiple COTs of the window, and wherein the at least one processor is further configured to determine a feedback timing for transmission of the acknowledgement feedback of the feedback codebook based on a feedback timing value and the first possible PDSCH occasions that occur during the plurality of COTs.

19. The apparatus of claim 15, wherein the at least one processor is further configured to:
to receive, during a slot of the window, a downlink control message including a multiple PDSCH indicator that indicates multiple PDSCHs are scheduled for at least one slot of the window; and
to refrain from reducing the size of the feedback codebook based on the multiple PDSCH indicator.

20. The apparatus of claim 15, wherein the at least one processor is further configured to:
to receive, during the window, one or more downlink control messages;
to determine whether the one or more downlink control messages include a multiple PDSCH indicator that indicates whether multiple PDSCHs are scheduled for at least one slot of the window; and
to reduce the size of the feedback codebook based on determining that the one or more downlink control messages do not include the multiple PDSCH indicator.

21. The apparatus of claim 20, wherein the multiple PDSCH indicator indicates that multiple PDSCHs are actually scheduled for at least one slot of the window, and wherein the size of the feedback codebook is reduced by eliminating acknowledgement feedback entries for additional PDSCHs for each slot of the window.

* * * * *